US008541988B2

(12) United States Patent
Horihata et al.

(10) Patent No.: US 8,541,988 B2
(45) Date of Patent: Sep. 24, 2013

(54) ROTARY ELECTRIC MACHINE IMPROVED TO CARRY OUT LOAD-DUMP PROTECTION

(75) Inventors: Harumi Horihata, Nagoya (JP); Tadatoshi Asada, Anjo (JP)

(73) Assignee: Denso Corporation, Kariya (JP)

( * ) Notice: Subject to any disclaimer, the term of this patent is extended or adjusted under 35 U.S.C. 154(b) by 142 days.

(21) Appl. No.: 13/179,268

(22) Filed: Jul. 8, 2011

(65) Prior Publication Data
US 2012/0007568 A1 Jan. 12, 2012

(30) Foreign Application Priority Data

Jul. 9, 2010 (JP) ................................. 2010-156709
Jul. 20, 2010 (JP) ................................. 2010-162602
Jul. 26, 2010 (JP) ................................. 2010-167318
Jul. 29, 2010 (JP) ................................. 2010-170210

(51) Int. Cl.
*H02P 9/10* (2006.01)

(52) U.S. Cl.
USPC ............................................................. 322/21

(58) Field of Classification Search
USPC ................................................ 322/12, 18, 21
See application file for complete search history.

(56) References Cited

U.S. PATENT DOCUMENTS

| 5,748,463 | A | 5/1998 | Tsutui et al. | |
|---|---|---|---|---|
| 6,353,307 | B1 | 3/2002 | Koelle et al. | |
| 7,453,240 | B2 * | 11/2008 | Yamauchi et al. | 322/12 |
| 7,629,776 | B2 * | 12/2009 | Chemin et al. | 322/24 |
| 7,915,867 | B1 * | 3/2011 | Bulthaup et al. | 322/18 |
| 8,067,910 | B2 * | 11/2011 | Sejimo | 318/400.01 |

FOREIGN PATENT DOCUMENTS

| JP | A-55-074324 | 6/1980 |
|---|---|---|
| JP | A-09-219938 | 8/1997 |
| JP | A-2002-523008 | 7/2002 |
| JP | B2-3396955 | 4/2003 |
| JP | A-2003-244864 | 8/2003 |
| JP | A-2007-189773 | 7/2007 |

OTHER PUBLICATIONS

Jan. 23, 2013 Office Action issued in U.S. Appl. No. 13/173,884.

* cited by examiner

*Primary Examiner* — Tulsidas C Patel
*Assistant Examiner* — Sean Gugger
(74) *Attorney, Agent, or Firm* — Oliff & Berridge, PLC

(57) ABSTRACT

A rectifying unit rectifies an alternating current voltage induced across each of at least two-phase stator windings. A turn-on unit monitors an output voltage of the rectifying unit, and turns on a switching element as a low-side rectifying element for at least one of the at least two-phase stator windings when the output voltage exceeds a first threshold voltage due to load dump. After the output voltage, which exceeded the first threshold voltage once, falls below a second threshold voltage, a turnoff unit waits for turnoff of the switching element until a turnoff time suited for preventing occurrence of a surge across the at least one of the at least two-phase stator windings appears. The second threshold voltage is set to be lower than the first threshold voltage. The turnoff unit turns off, at the appearance of the turnoff time, the switching element.

30 Claims, 19 Drawing Sheets

FIG. 18
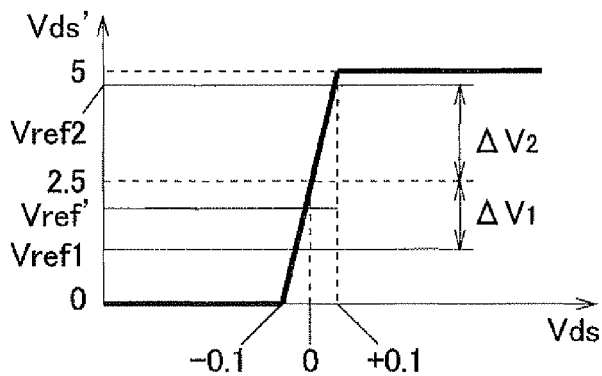
FIG. 19
| Duty N | 20% | 50% | 100% |
|---|---|---|---|
| 1800rpm | 110A | 120A | 140A |
| 6000rpm | 50A | 80A | 130A |
| 18000rpm | 35A | 75A | 130A |
FIG. 20
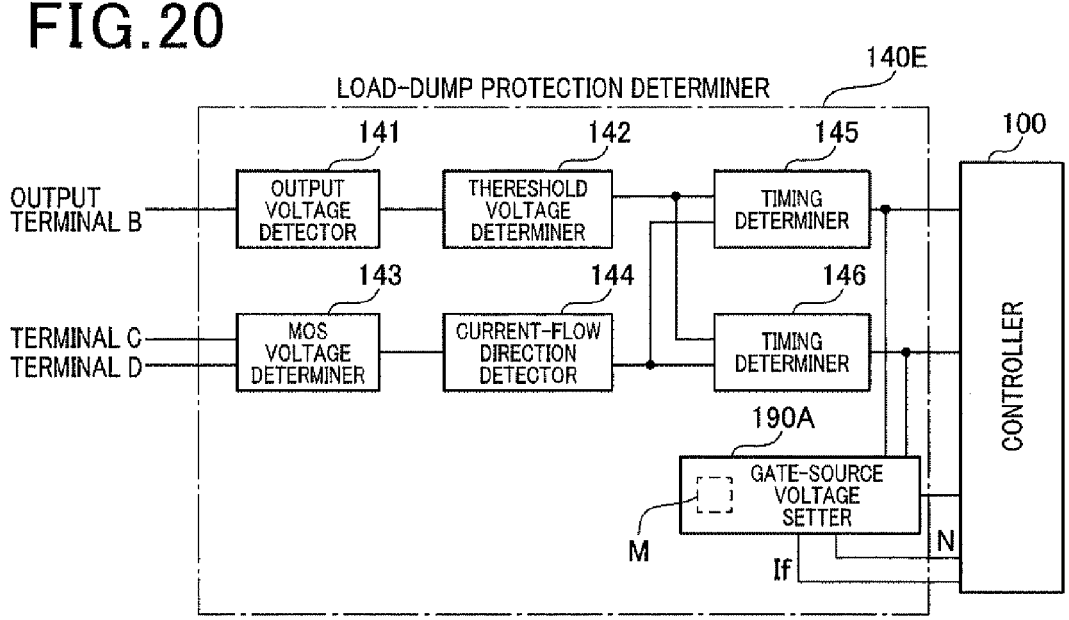

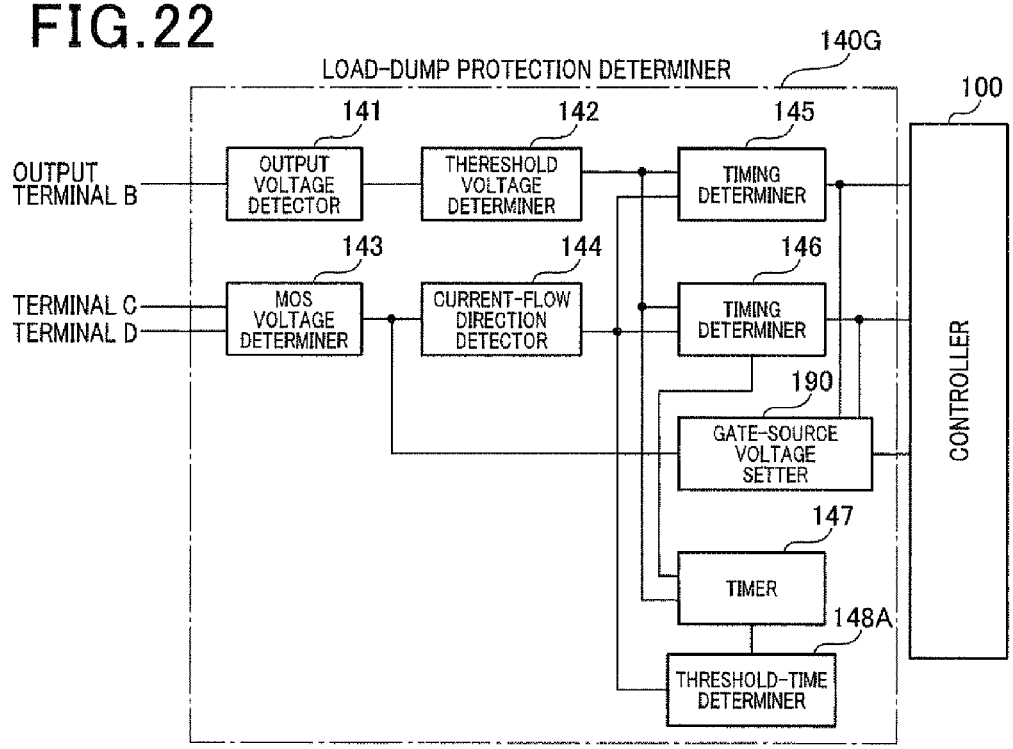
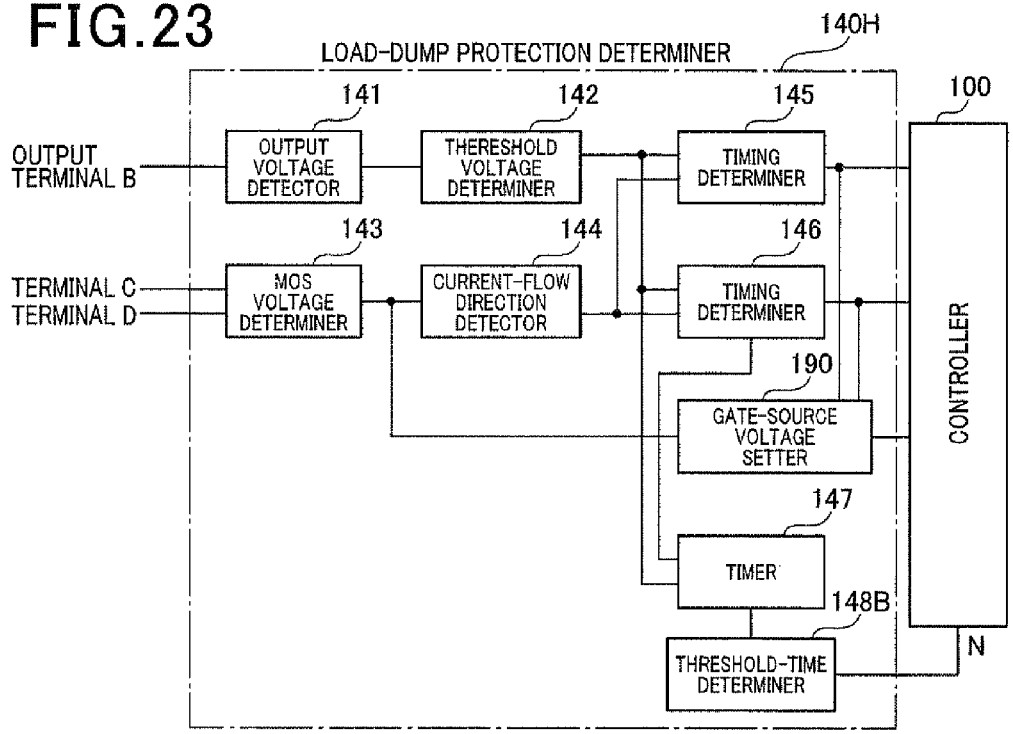

ROTARY ELECTRIC MACHINE IMPROVED TO CARRY OUT LOAD-DUMP PROTECTION

CROSS REFERENCE TO RELATED APPLICATIONS

This application is based on Japanese Patent Applications 2010-156709, 2010-162602, 2010-167318, and 2010-170210, filed on Jul. 9, 2010, Jul. 20, 2010, Jul. 26, 2010, and Jul. 29, 2010, respectively. This application claims the benefit of priority from the Japanese Patent Applications, so that the descriptions of which are all incorporated herein by reference.

TECHNICAL FIELD

The present disclosure relates to rotary electric machines for generating electrical power and/or moving power, and more particularly, to such rotary electric machines designed to carry out load-dump protection.

BACKGROUND

Power generators for motor vehicles are operative to supply electric power to a buttery for charging the buttery and to various electrical loads for allowing the electrical loads to operate. While such a power generator is operating to supply electric power to a battery and/or various electrical loads, the disconnection of the battery from the power generator, which is referred to as "load dump", causes a high voltage (a giant pulse) across a corresponding phase stator winding due to its large impedance. The peak of such a high voltage may get to be equal to or higher than 100 V depending on an output current of the power generator. Because this kind of a high voltage would damage any electrical loads and/or electrical elements in the power generator, some measures to reduce a high voltage have been taken.

A power generator disclosed in U.S. Pat. No. 5,748,463 corresponding to Japanese Patent Application Publication No. H09(1997)-219938 shows one of these measures. The power generator disclosed in the Patent Publication is provided with MOS transistors as low-side switching elements of a bridge rectifier thereof. The power generator is designed to, when the output voltage of the power generator exceeds a preset reference voltage, operate in protection mode to turn on at least one lower-side MOS transistor corresponding to at least one phase stator winding across which a high voltage due to load dump is generated, thus circulating current based on the high voltage through the bridge rectifier and the stator windings to decay the high voltage.

When the output voltage of the power generator becomes equal to or lower than the reference voltage based on the turn-on of the at least one low-side MOS transistor, the power generator is designed to turn off the at least one lower-side MOS transistor, and to shift to rectifying mode to carryout rectifying operations.

In addition, a power generator disclosed in Japanese Patent Application Publication No. 2003-244864 shows another of these measures. The power generator is designed to, when a high voltage is detected, shift to protection mode to drive each of high-side MOS FETs and low-side MOSFETs of a bridge rectifier in an on-off phase opposite to a normal on-off phase in rectifying mode. When the high voltage decays, the power generator is designed to shift to the rectifying mode to switch the on-off phase of each of the high- and low-side MOSFETs to the normal on-off phase in the rectifying mode.

SUMMARY

As described above, the power generator disclosed in the U.S. Pat. No. 5,748,463 turns on at least one low-side MOS transistor corresponding to at least one phase stator winding across which a high voltage due to load dump is generated when the output voltage exceeds the threshold voltage, and turns off the at least one low-side MOS transistor when the output voltage becomes lower than the threshold voltage. That is, the power generator disclosed in the U.S. Pat. No. 5,748,463 repeats on and off of an at least one MOS transistor corresponding to at least one phase stator winding across which a high voltage is generated until magnetic energy charged in the at least one phase stator winding sufficiently decays.

However, the turnoff behavior of the at least one lower-side MOS transistor results in instantaneous interruption of current flowing through the corresponding at least one phase stator winding connected to the at least one MOS transistor. The instantaneous interruption generates a high voltage across the corresponding phase stator winding, and the high voltage may exceed the reference voltage. That is, the measure disclosed in the U.S. Pat. No. 5,748,463 may take considerable time to sufficiently decay magnetic energy charged in the corresponding phase stator winding due to load dump. Thus, there is a need to sufficiently decay a high voltage due to load dump as immediately as possible.

In another viewpoint, the measure disclosed in the U.S. Pat. No. 5,748,463 requires turnoff of the low-side MOS transistors repeatedly, and, at each turnoff of the low-side MOS transistor, a surge may be generated. For this reason, the power generator may become unstable in its operation when shifting to the rectifying mode from the protection mode. Thus, there is a need to make the power generator stably shift in its operation mode from the protection mode to the rectifying mode.

In addition, the power generator disclosed in the JP Patent Publication No. 2003-244864 switches the present on-off phase of each of the high- and low-side MOSFETs to an on-off phase opposite to the present on-off phase when the power generator shifts to the protection mode at the occurrence of load dump, or cancels the protection mode to shift to the rectifying mode. Thus, if a current flows through a phase stator winding connected to at least one high or low-side MOSFET with the at least one high or low-side MOSFET is reversed in phase, a high voltage is generated across the phase stator winding. Particularly, if paired high and low-side switching elements for the same phase are simultaneously turned off, this simultaneous turnoff may result in instantaneous interruption of current flowing through a corresponding phase stator winding connected to the paired high and low-side switching elements. The instantaneous interruption may generate a surge across the corresponding phase stator winding. Thus, there is a need to prevent the occurrence of such a surge at mode shift of the power generator.

In view of the circumstances set forth above, one aspect of the present disclosure seeks to provide rotary electric machines designed to react these needs set forth above.

Specifically, an alternative aspect of the present disclosure aims to provide such rotary electric machines improved to immediately decay a high voltage due to load dump. A further aspect of the present disclosure aims to provide such rotary electric machines improved to prevent the occurrence of a surge at their mode shifts. A still further aspect of the present disclosure aims to provide such rotary electric machines designed to improve the reliability of protection of them against load dump.

According to one aspect of the present disclosure, there is provided a rotary electric machine with a rotatable rotor. The rotary electric machine includes at least two-phase stator windings, and a rectifying unit including, for each of the at least two-phase stator windings, a pair of a high-side rectifying element and a low-side rectifying element. At least the low-side rectifying element is comprised of a switching element with a diode parallely connected thereto, the rectifying unit being configured to rectify an alternating current voltage induced across each of the at least two-phase stator windings. The rotary electric machine includes a turn-on unit configured to monitor the output voltage of the rectifying unit, and turn on the switching element as the low-side rectifying element for at least one of the at least two-phase stator windings when the output voltage exceeds a first threshold voltage due to load dump. The rotary electric machine includes a turnoff unit configured to monitor the output voltage of the rectifying unit, and, after the output voltage, which exceeded the first threshold voltage once, falls below a second threshold voltage, wait for turnoff of the switching element as the low-side rectifying element for the at least one of the at least two-phase stator windings until a turnoff time suited for preventing occurrence of a surge across the at least one of the at least two-phase stator windings appears, the second threshold voltage being set to be lower than the first threshold voltage. The turnoff unit is configured to turn off, at the appearance of the turnoff time, the switching element as the low-side rectifying element for the at least one of the at least two-phase stator windings.

The one aspect of the present disclosure waits for turnoff of the switching element as the low-side rectifying element for the at least one of the at least two-phase stator windings until the turnoff time suited for preventing occurrence of a surge across the at least one of the at least two-phase stator windings appears although the output voltage, which exceeded the first threshold voltage once, falls below the second threshold voltage. In response to the appearance of the turnoff time, the one aspect of the present disclosure turns off the switching element as the low-side rectifying element for the at least one of the at least two-phase stator windings. Thus, the one aspect of the present disclosure turns off the switching element at the turnoff time suited for preventing occurrence of a surge across the at least one of the at least two-phase stator windings. This makes it possible to restart normal rectifying operations as early as possible without the occurrence of a surge.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with reference to the accompanying drawings in which.

Figure 1:
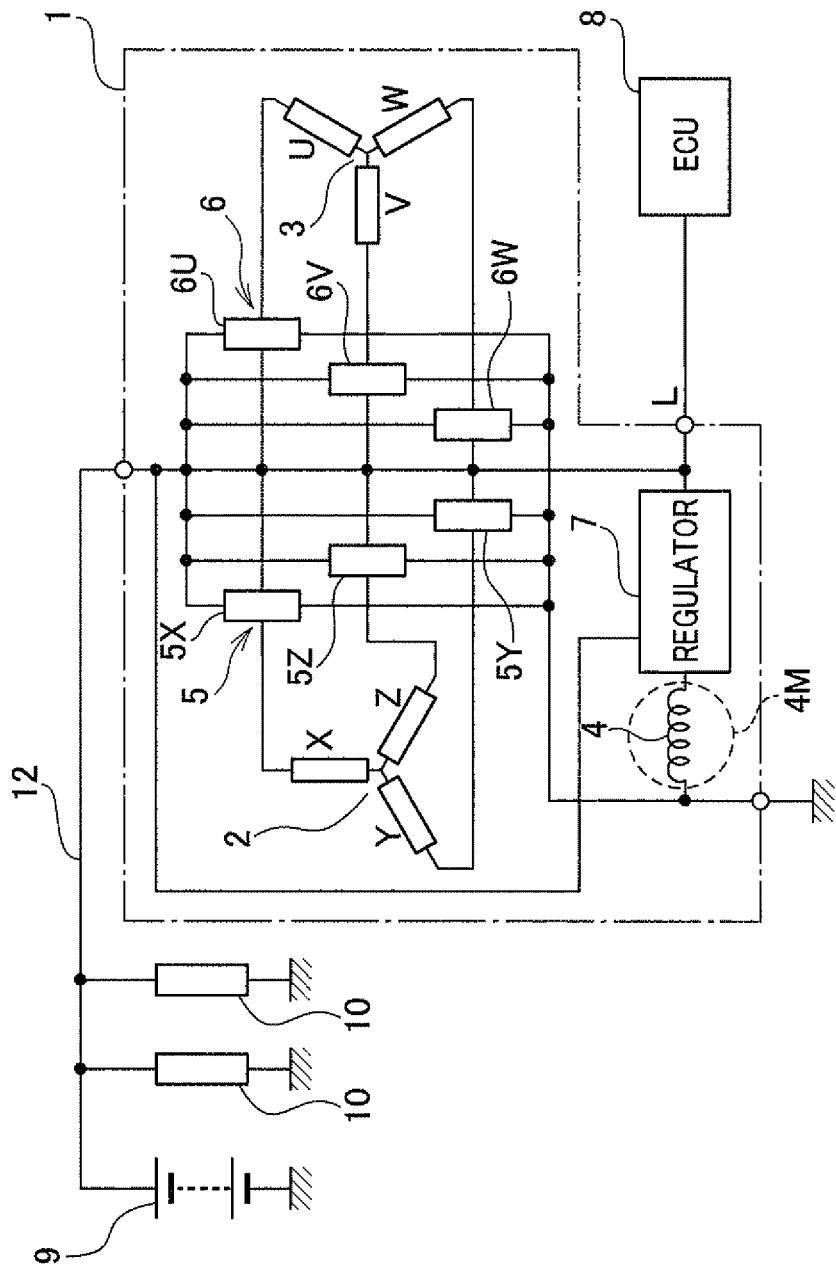
FIG. 1 is a circuit diagram schematically illustrating an example of the system configuration of a rotary electric machine according to the first embodiment of the present invention.
Figure 3:
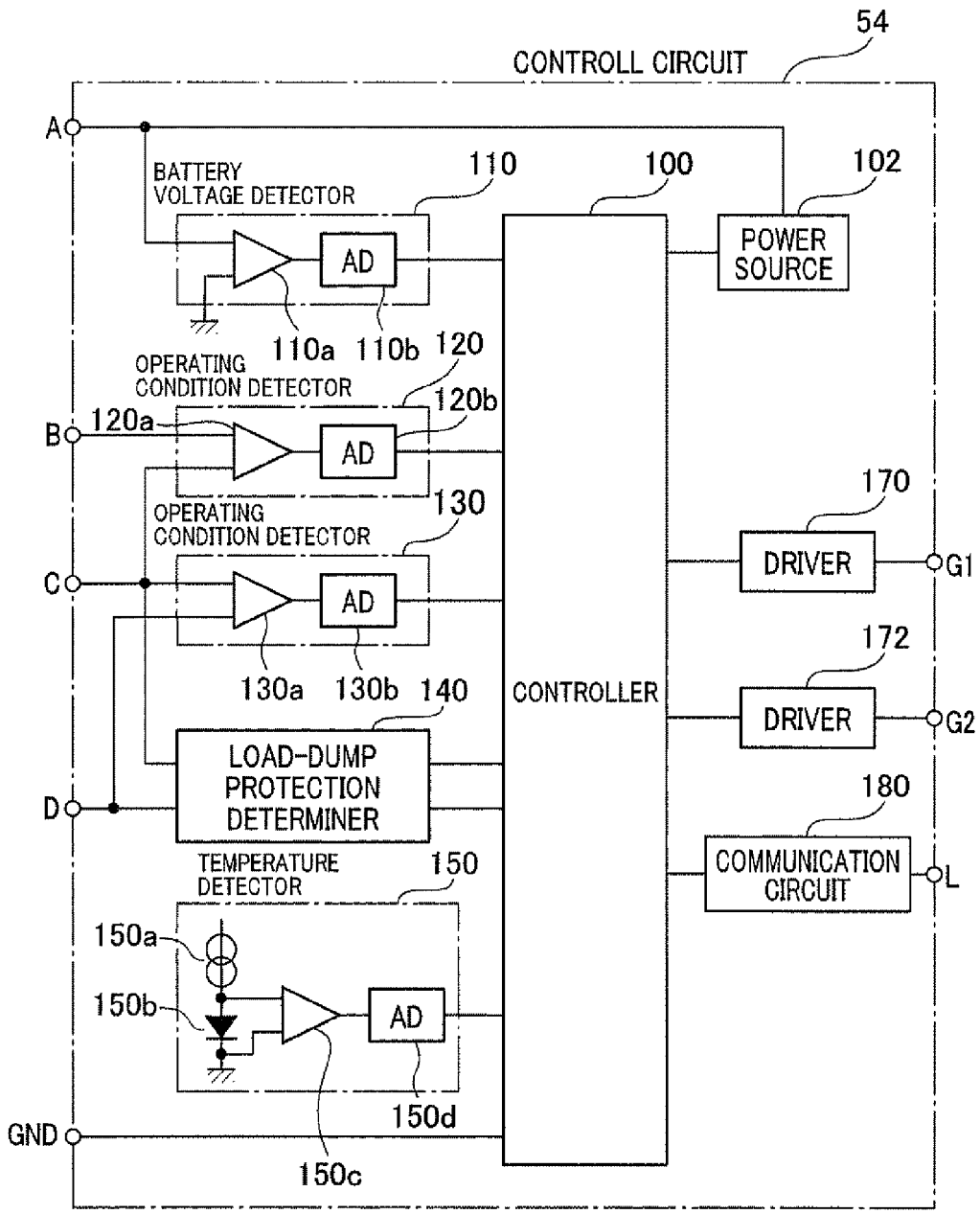
FIG. 3 is a circuit diagram schematically illustrating an example of the structure of a control circuit illustrated in FIG. 2.
Figure 5:
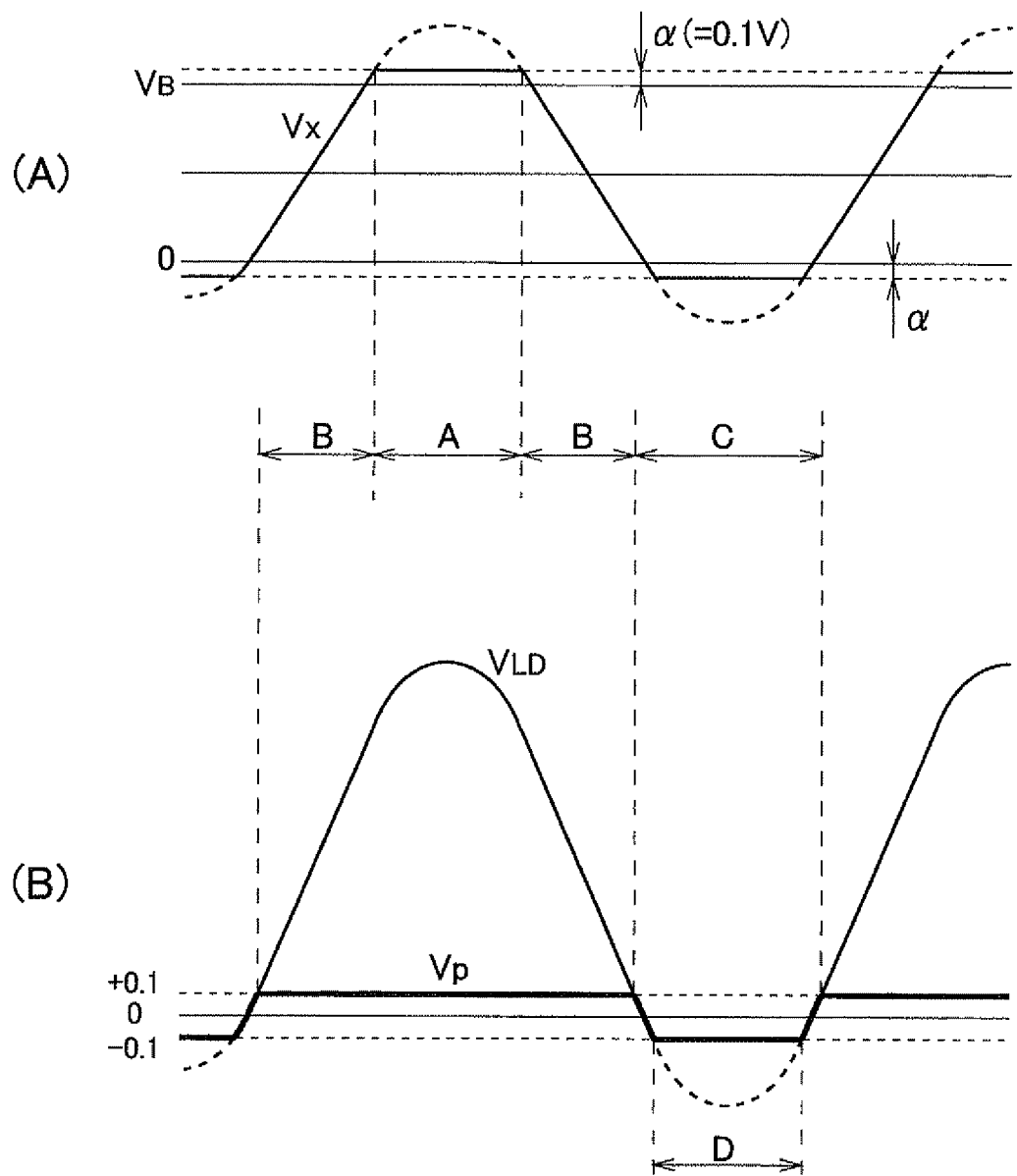
Figure 6:
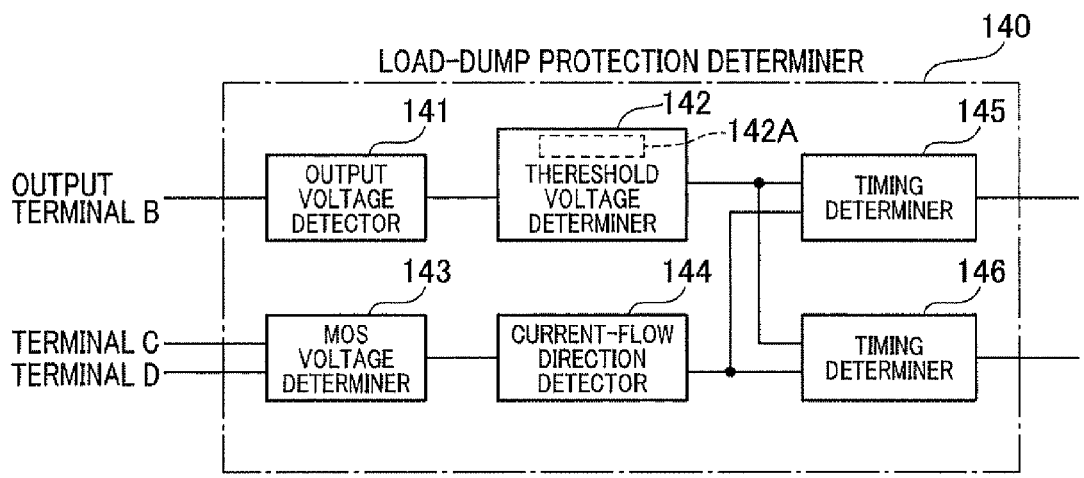
Figure 7:
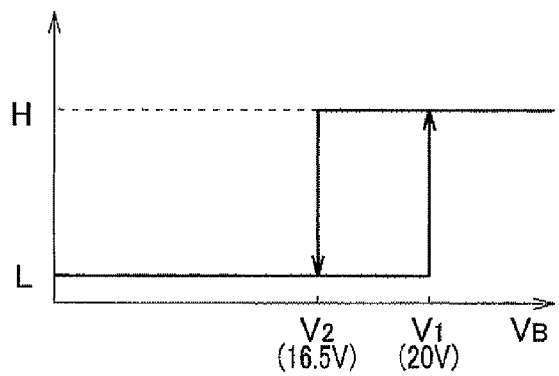
Figure 8:
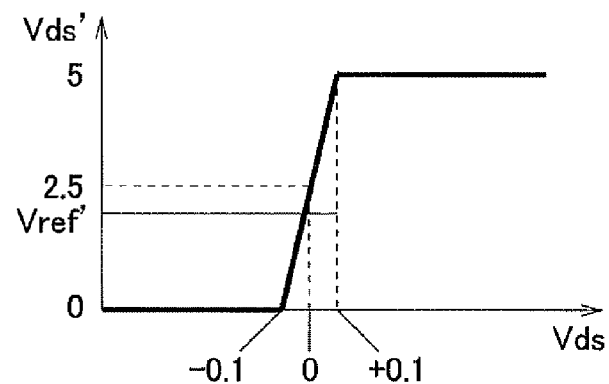
Figure 9:
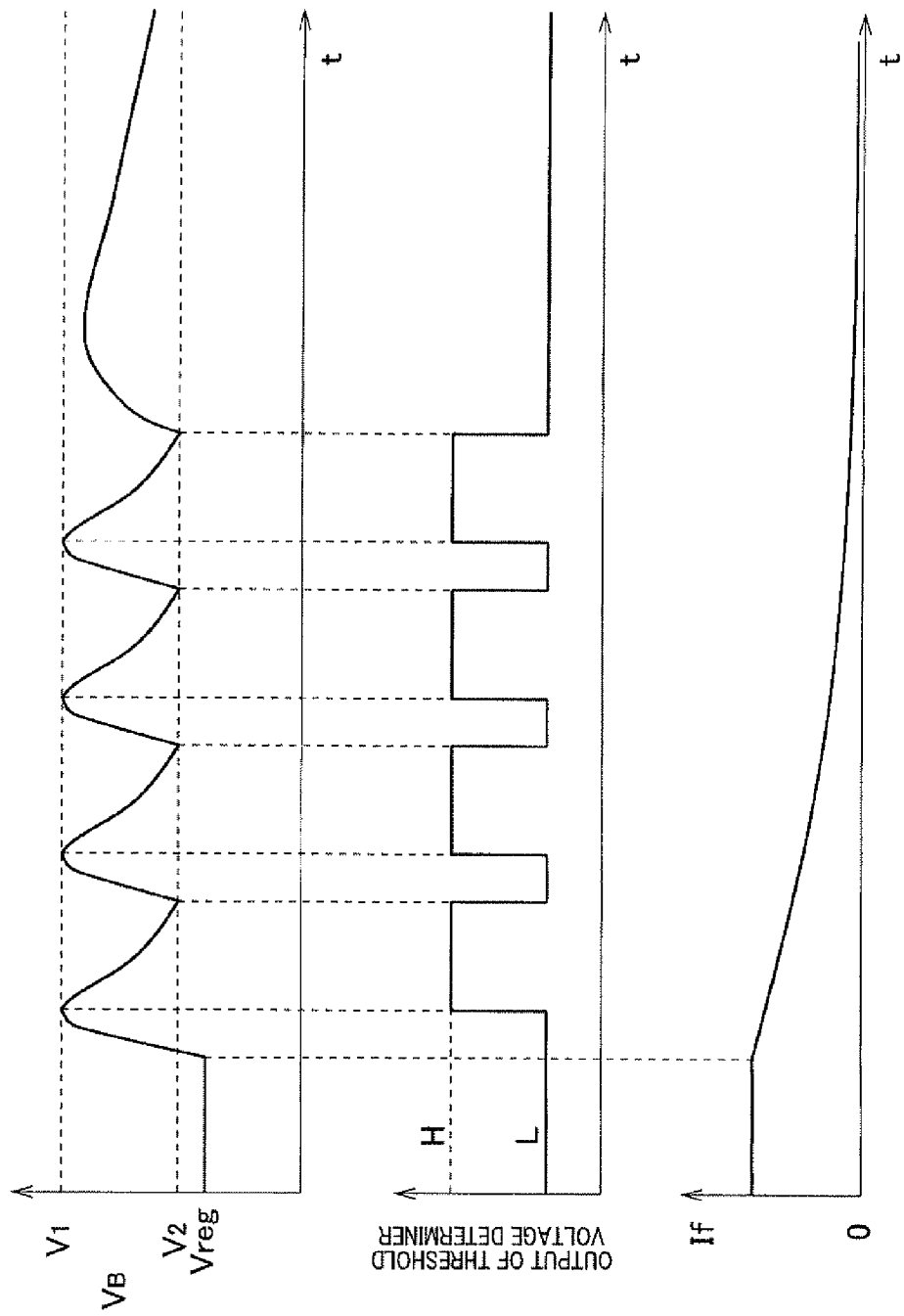
Figure 10:
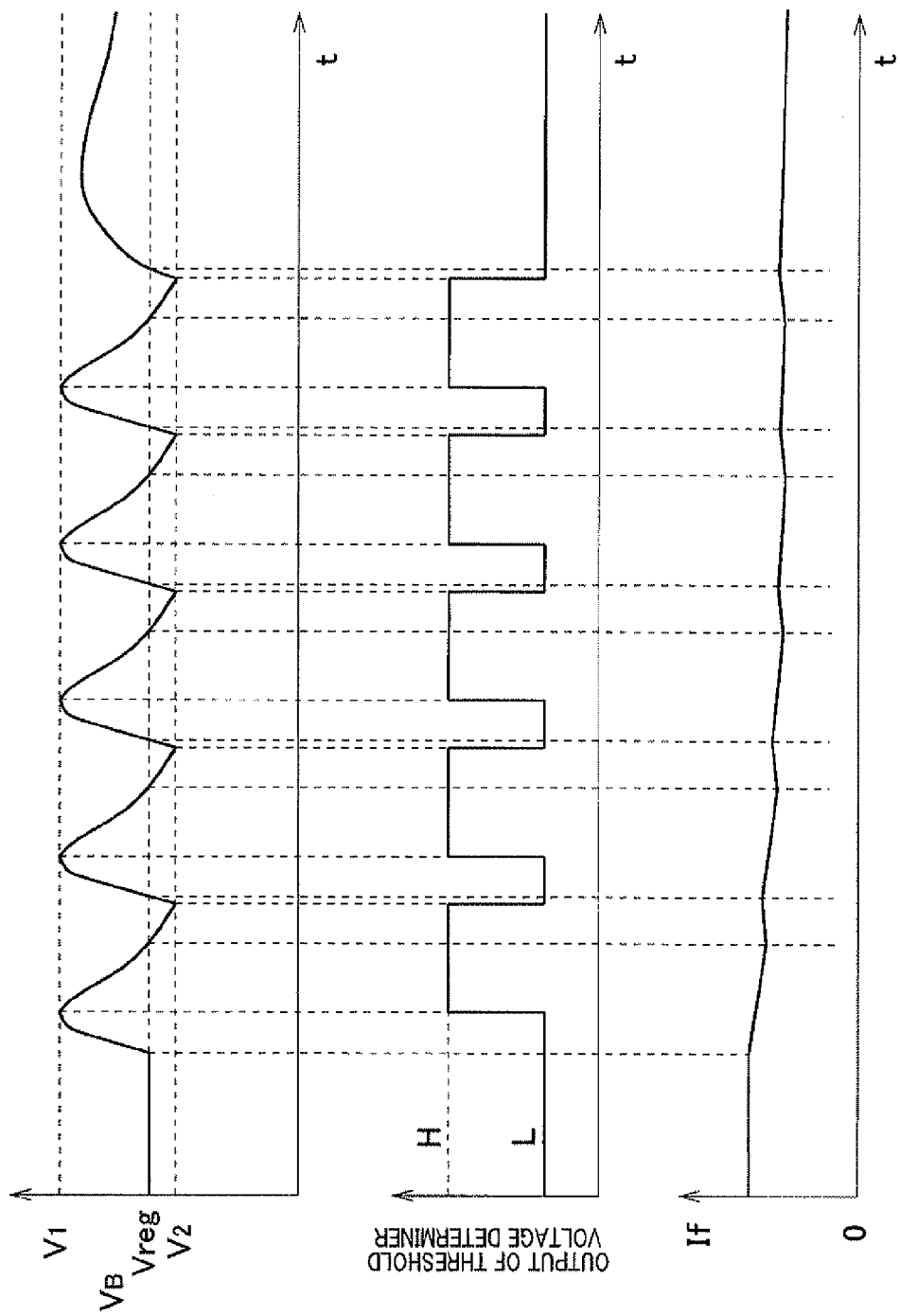
Figure 11:
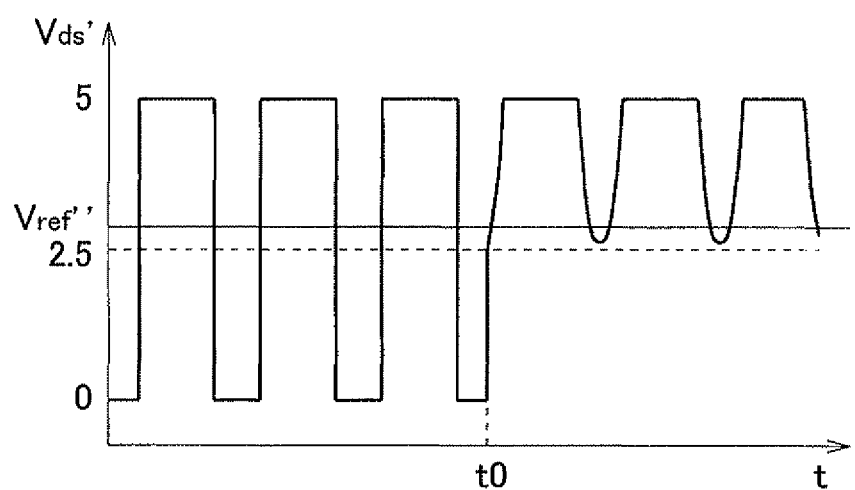
Figure 12:
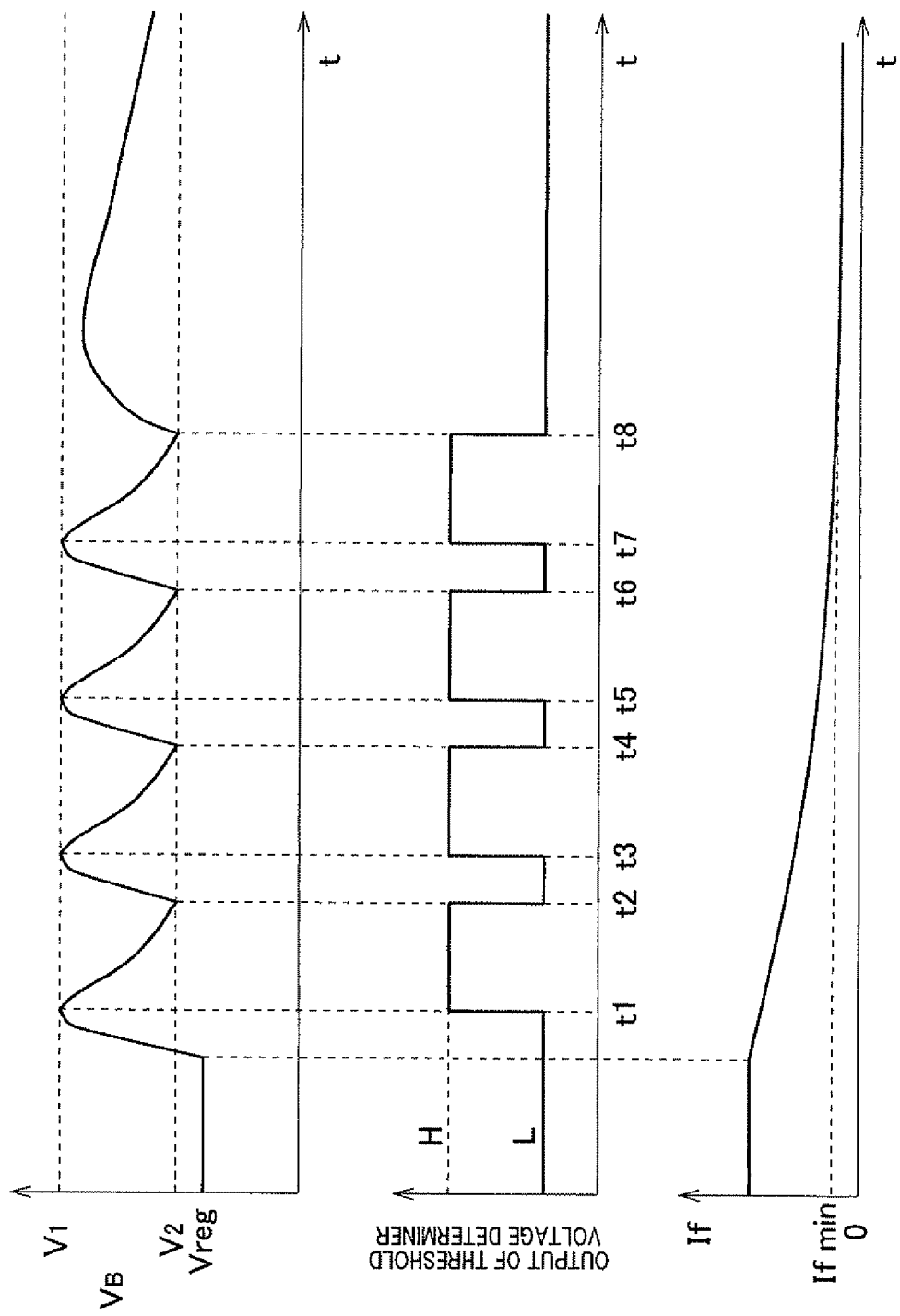
Figure 13:
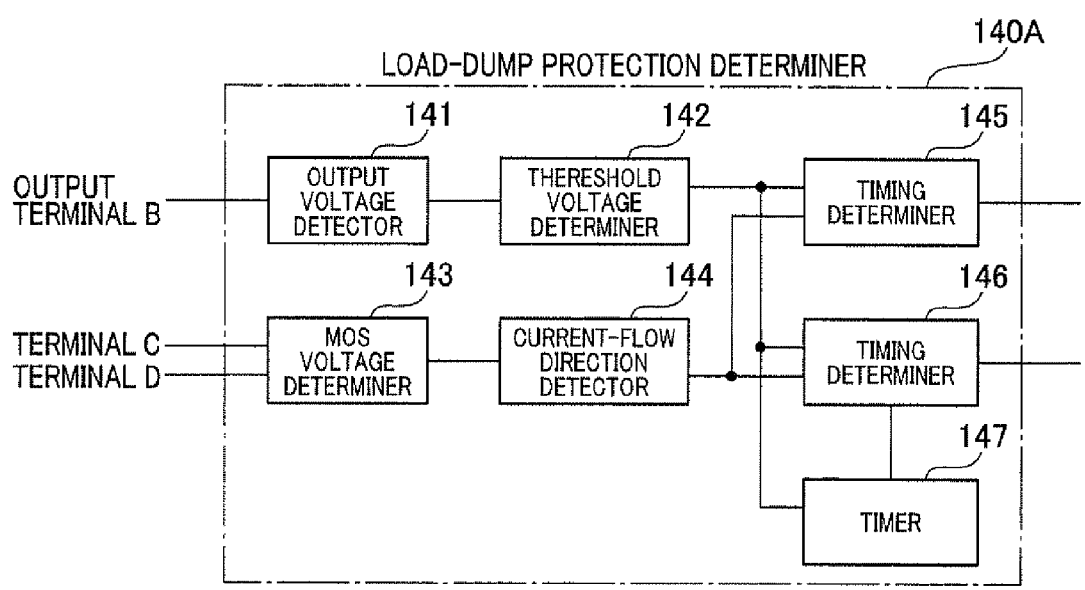
Figure 14:
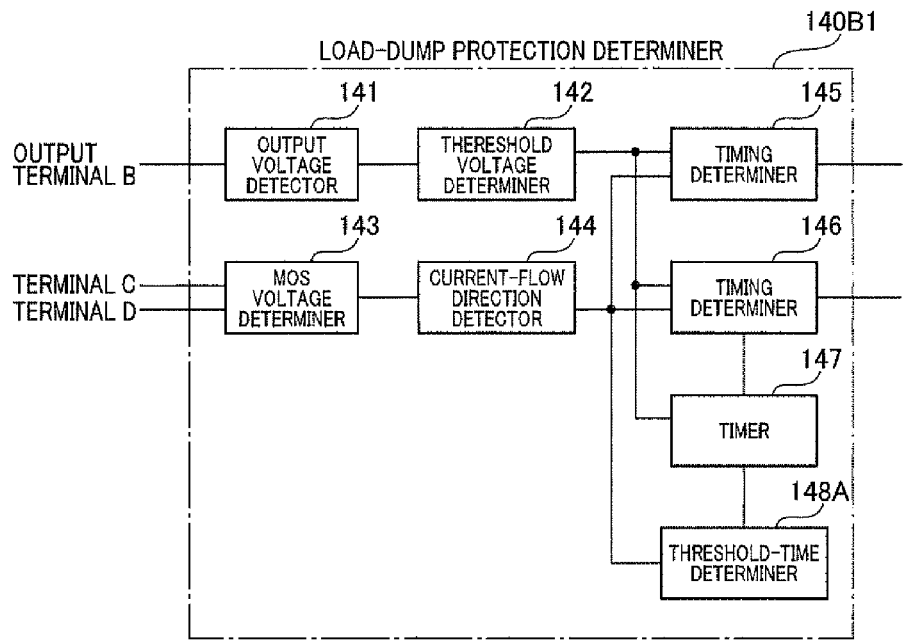
Figure 15:
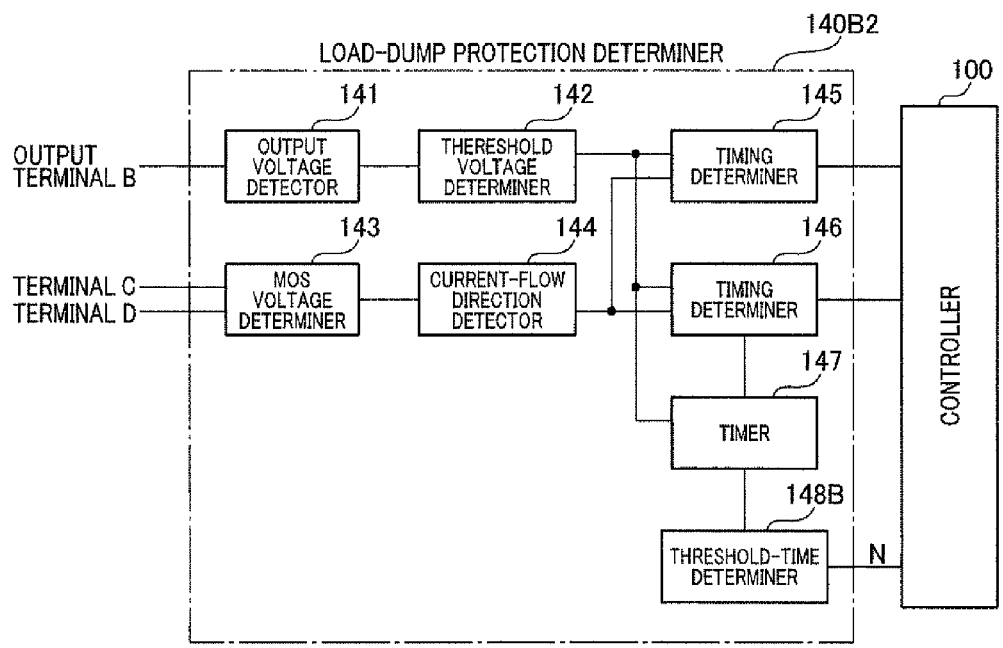
Figure 16:
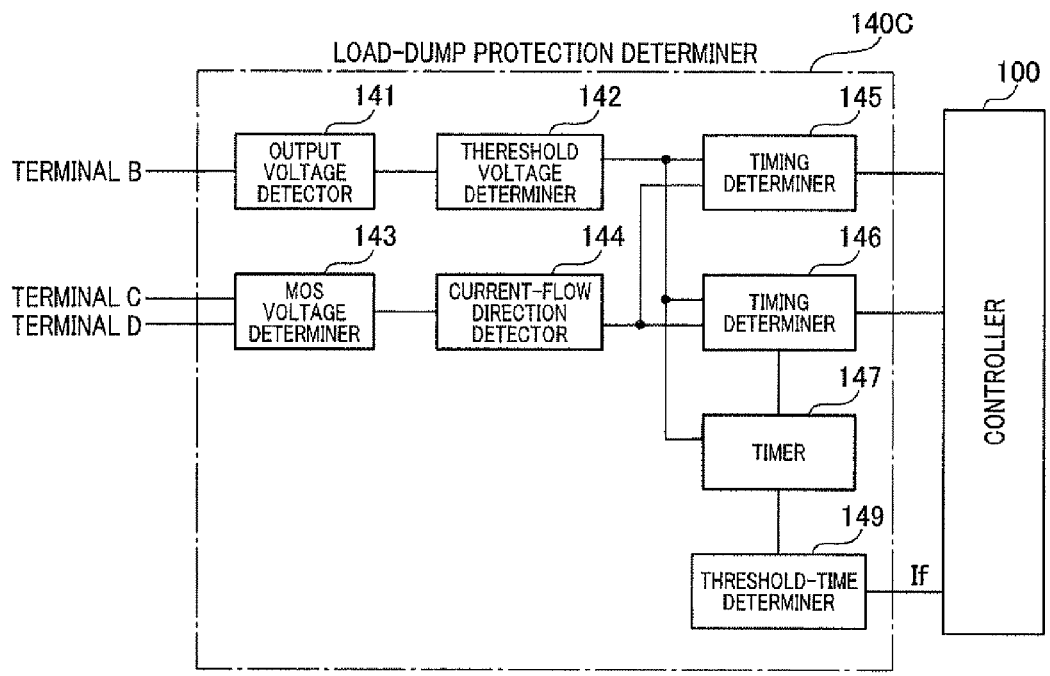
Figure 17:
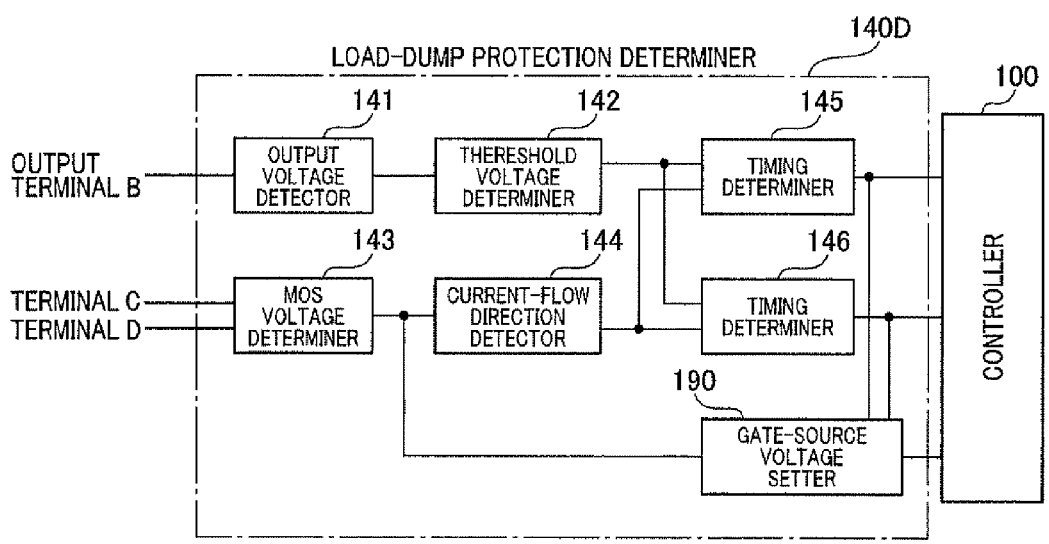
Figure 21:
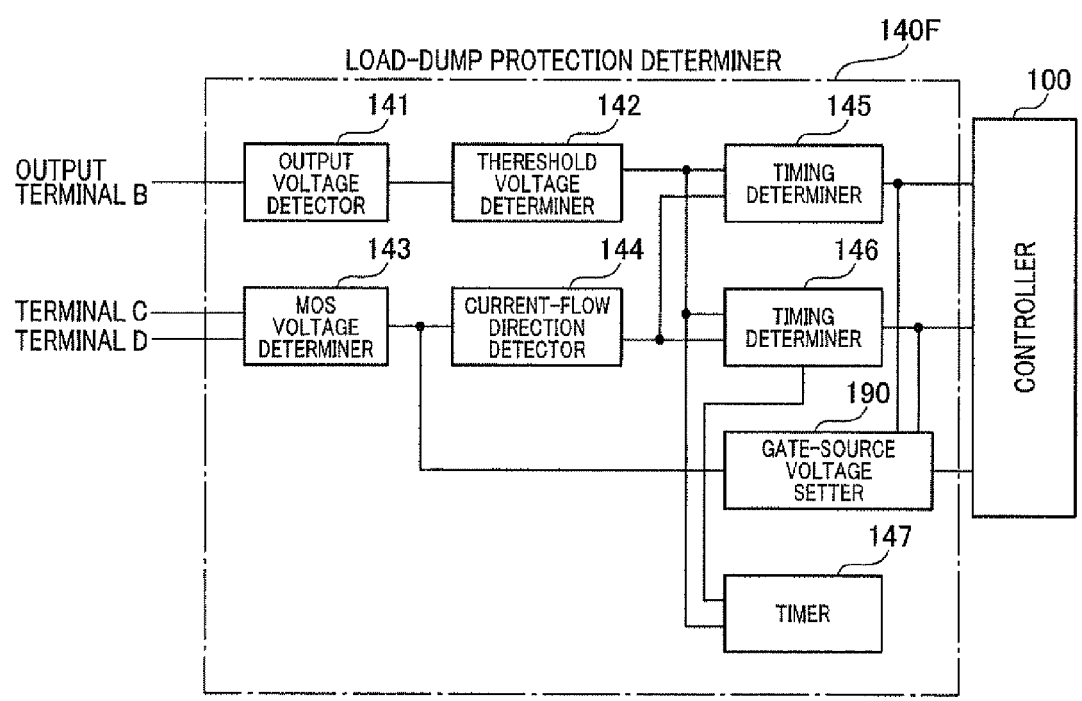
Figure 24:
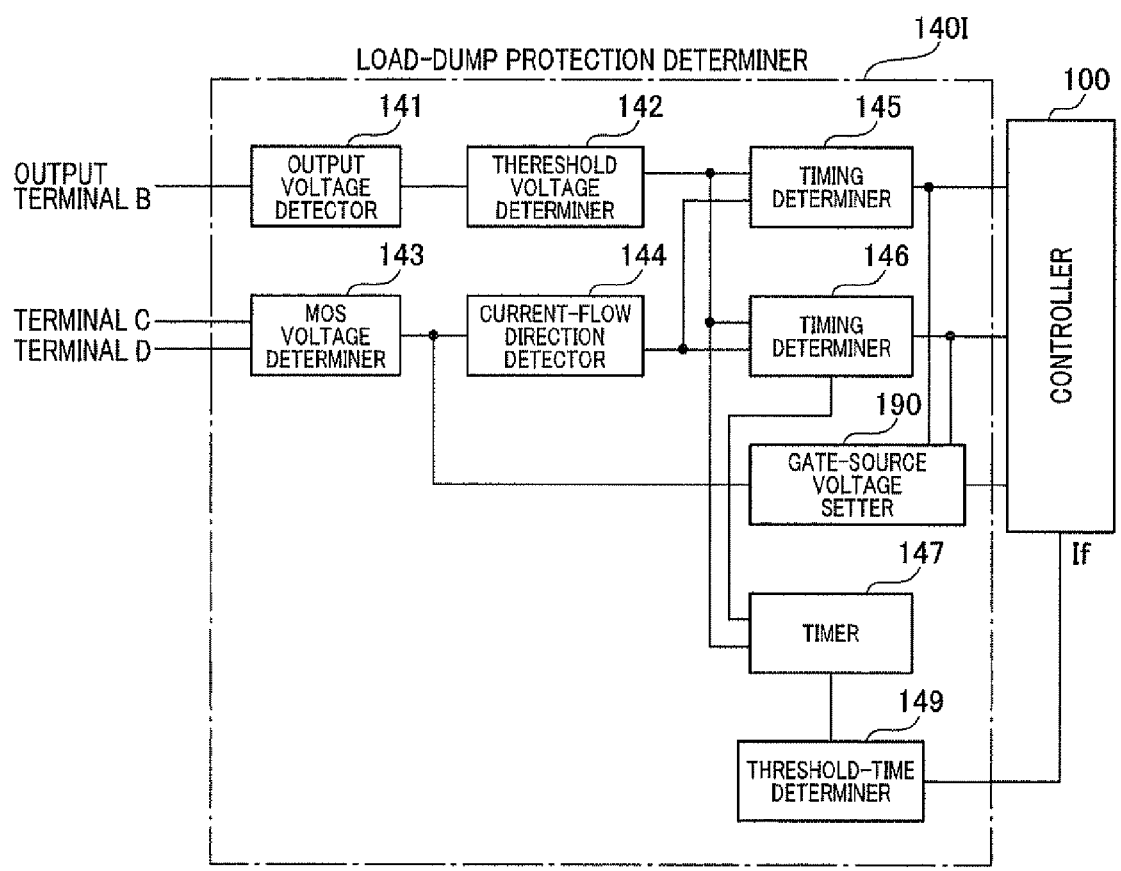
Figure 25:
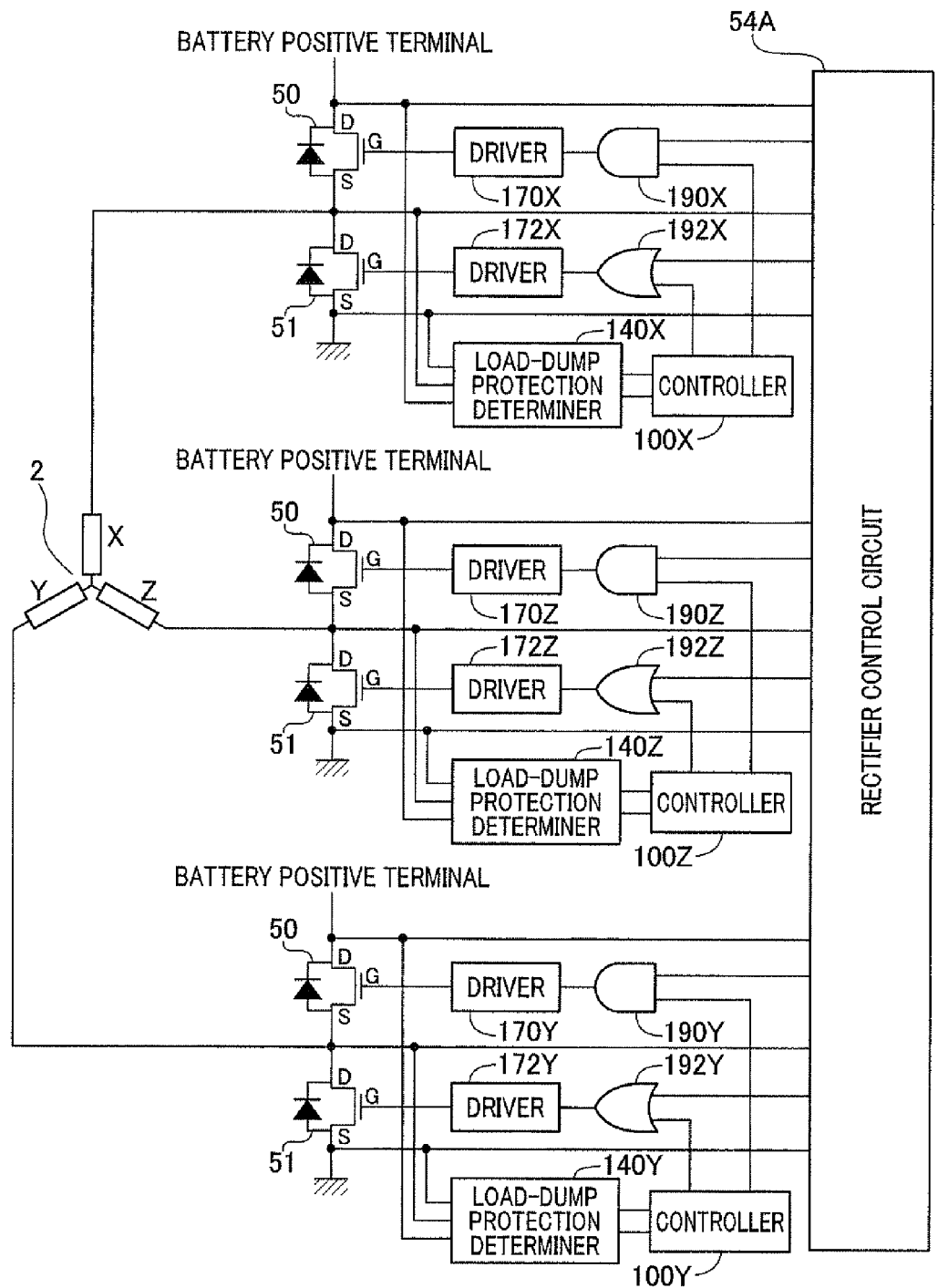
Figure 26:
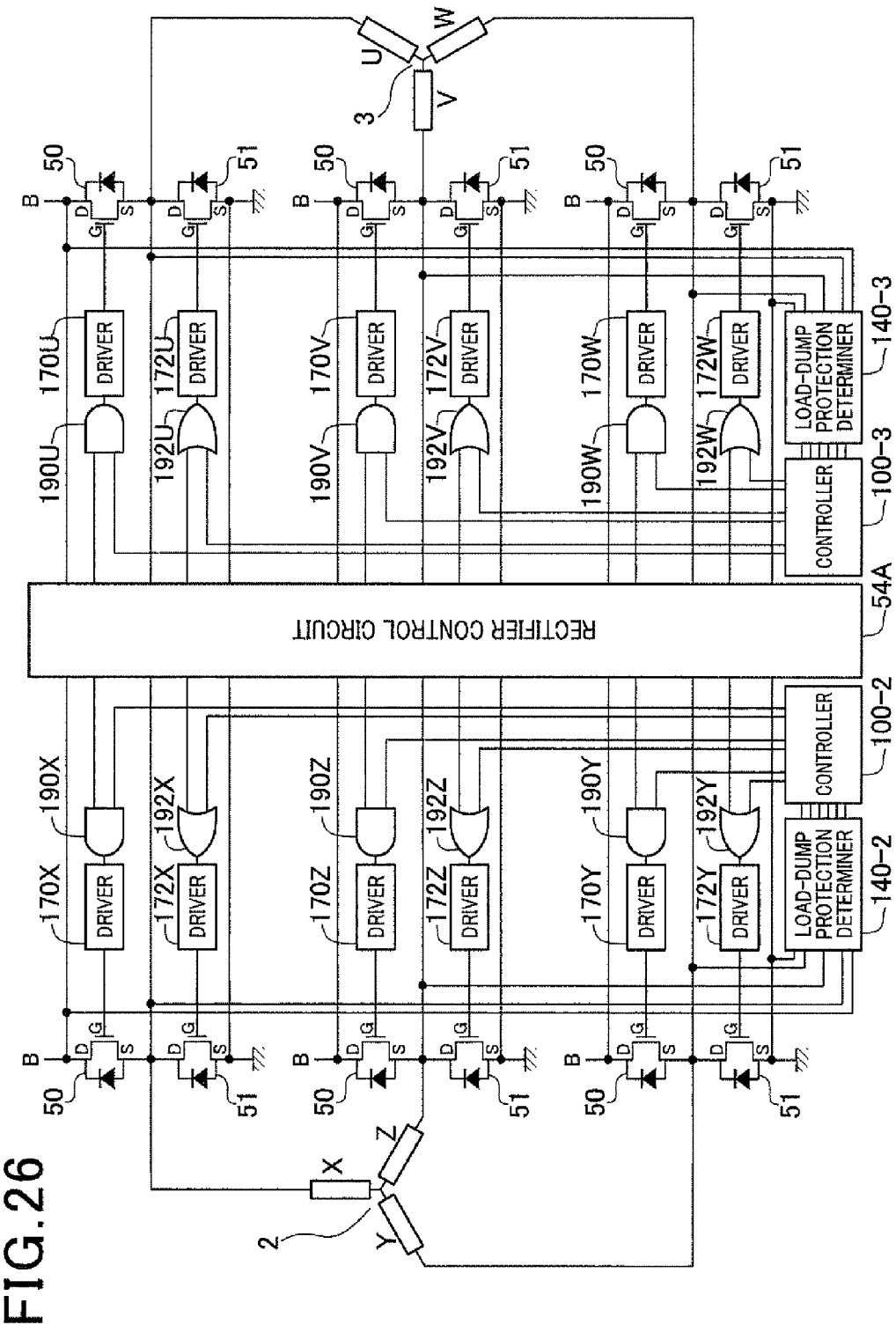

(A) of FIG. 5 is a graph schematically illustrating an example of the waveform of a phase voltage across a phase winding in a rectifying mode, and (B) of FIG. 5 is a graph schematically illustrating an example of the waveform of a high phase voltage generated across the phase winding due to load dump;

FIG. 6 is a block diagram schematically illustrating an example of the structure of a load-dump protection determiner illustrated in FIG. 3;

FIG. 7 is a graph schematically illustrating a relationship between an output voltage of the rotary electric machine and a result of determination by a threshold voltage determiner illustrated in FIG. 6;

FIG. 8 is a graph schematically illustrating a relationship between an amplified drain-source voltage and an amplified reference voltage according to the first embodiment;

FIG. 9 includes graphs schematically illustrates the variation of an output voltage of the power generator, the variation of a deter mined result of a threshold voltage determiner illustrated in FIG. 6, and the variation of a field current flowing through a field winding illustrated in FIG. 1 if a second threshold voltage is set to a value higher than a target regulated voltage;

FIG. 10 includes graphs schematically illustrates the variation of the output voltage of the power generator, the variation of a determined result of the threshold voltage determiner, and the variation of the field current flowing through the field winding 4 if the second threshold voltage is set to a value equal to or lower than the target regulated voltage;

FIG. 11 is a graph schematically illustrating the output of a MOS voltage detector illustrated in FIG. 6 if only one rectifier module for one of first and second stator windings shifts to a protection mode while the other rectifier modules do not shift to the protection mode according to the first embodiment;

FIG. 12 includes graphs schematically illustrating the variation of the output voltage, the variation of a determined result of the threshold voltage determiner, and the variation of the field current flowing through the field winding if: the setting of the second threshold voltage to a value higher than the target regulated voltage, and a constant current is forcibly supplied to the field winding during the protection mode;

FIG. 13 is a block diagram schematically illustrating an example of the structure of a load-dump protection determiner illustrated in FIG. 3 according to the second embodiment of the present disclosure;

FIG. 14 is a block diagram schematically illustrating an example of the structure of a load-dump protection determiner illustrated in FIG. 3 according to the first modification of the second embodiment of the present disclosure;

FIG. 15 is a block diagram schematically illustrating an example of the structure of a load-dump protection determiner illustrated in FIG. 3 according to the second modification of the second embodiment of the present disclosure;

FIG. 16 is a block diagram schematically illustrating an example of the structure of a load-dump protection determiner illustrated in FIG. 3 according to the third modification of the second embodiment of the present disclosure;

FIG. 17 is a block diagram schematically illustrating an example of the structure of a load-dump protection determiner illustrated in FIG. 3 according to the third embodiment of the present disclosure;

FIG. 18 is a graph schematically illustrating how a gate-source voltage setter illustrated in FIG. 17 variably sets a gate-source voltage according to the third embodiment;

FIG. 19 is a table schematically illustrates a relationship between a variable of a duty cycle of current to be supplied to the field winding immediately before the shift to the protection mode, a variable of a rotational speed of a rotor immediately before the shift to the protection mode, and a variable of current flowing through a low-side MOS transistor of a rectifier module after the shift to the protection mode according to the third embodiment;

FIG. 20 is a block diagram schematically illustrating a load-dump protection determiner as a first modification of the load-dump protection determiner illustrated in FIG. 17 according to the third embodiment;

FIG. 21 is a block diagram schematically illustrating a load-dump protection determiner as a second modification of the load-dump protection determiner illustrated in FIG. 17 according to the third embodiment;

FIG. 22 is a block diagram schematically illustrating a load-dump protection determiner as a third modification of the load-dump protection determiner illustrated in FIG. 17 according to the third embodiment;

FIG. 23 is a block diagram schematically illustrating a load-dump protection determiner as a fourth modification of the load-dump protection determiner illustrated in FIG. 17 according to the third embodiment;

FIG. 24 is a block diagram schematically illustrating a load-dump protection determiner as a fifth modification of the load-dump protection determiner illustrated in FIG. 17 according to the third embodiment;

FIG. 25 is a circuit diagram schematically illustrating a part of a power generator according to a first modification of each of the first to third embodiments; and FIG. 26 is a circuit diagram schematically illustrating a part of a power generator according to a second modification of each of the first to third embodiments.

DETAILED DESCRIPTION OF EMBODIMENT

Embodiments of the present disclosure will be described hereinafter with reference to the accompanying drawings. In the drawings, identical reference characters are utilized to identify identical corresponding components.

First Embodiment

Referring to the drawings, particularly to FIG. 1, there is illustrated a rotary electric machine 1 according to the first embodiment of the present disclosure. In this embodiment, the present disclosure is applied to a three-phase power generator 1 as an example of rotary electric machines installed in a motor vehicle.

The power generator 1 includes first stator windings 2, second stator windings 3, a rotor 4M including a field winding 4, a pair of first and second rectifier-modules (module assemblies) 5 and 6, and a voltage regulator (regulator) 7. The first and second rectifier-module assemblies 5 and 6 serve as switching units.

The power generator 1 is operative to convert an alternating-current (AC) voltage induced in each of the first and second stator windings 2 and 3 into a DC voltage via a corresponding one of the first and second rectifier-module assemblies 5 and 6, and supply the DC voltage to a battery 9 via a charge line 12 to charge it therein, and/or the DC voltage to electrical loads 10 installed in the motor vehicle via the charge line 12.

The power generator 1 is also operative to convert a DC voltage supplied from the battery 9 into a three-phase AC voltage via the first and second rectifier-module assemblies 5 and 6, and apply the three-phase AC voltage to each of the first and second stator windings 2 and 3 to thereby generate rotary power (torque) to rotate the rotor 4M. For example, the rotor 4M is directly or indirectly coupled to a crankshaft of an internal combustion engine, referred to simply as an engine, installed in the motor vehicle so that the generated rotary power turns the crankshaft of the internal combustion engine.

The first stator windings 2 are for example multiphase stator windings, such as three-phase stator windings. The first stator windings 2 are wound in and around a cylindrical stator core. For example, the stator core has an annular shape in its lateral cross section, and a plurality of slots formed therethrough and circumferentially arranged at given pitches. The first stator windings 2 are wound in the slots of the stator core.

Similarly, the second stator windings 3 are for example multiphase stator windings, such as three-phase stator windings. The second stator windings 3 are wound in and around, for example, the stator core. For example, the second stator windings 3 are wound in the slots of the armature core such that the first stator windings 2 and the second stator windings 3 have a phase shift of 30 electrical degrees ($\pi/6$ radians) therebetween. The first and second stator windings 2 and 3 and the stator core constitute a stator of the power generator 1.

The first stator windings 2 consist of X-, Y-, and Z-phase windings, which are connected in, for example, a star configuration. The X-, Y-, and Z-phase windings each have one end connected to a common junction (neutral point), and the other end to a separate terminal. Similarly, the second stator windings 3 consist of U-, V-, and W-phase windings, which are connected in, for example, a star configuration. The U-, V-, and W-phase windings each have one end connected to a common junction (neutral point), and the other end to a separate terminal.

The rotor 4M is attached to, for example, a rotary shaft (not shown) and, for example, rotatably disposed within the stator core. One end of the rotary shaft is linked to directly or indirectly to the crankshaft of the internal combustion engine such that the rotor 4M and the rotary shaft are rotatably driven by the internal combustion engine (engine). In other words, rotation of the rotor 4M can be transferred to the crankshaft of the engine as rotary power so that the crankshaft can be rotated by the rotary power.

The rotor 4M includes a plurality of field poles disposed to face the inner periphery of the stator core, and a field winding 4 wound in and around the field poles. The field winding 4 is electrically connected with the regulator 7 via slip rings and the like. When energized by the regulator 7, the field winding 4 magnetizes the field poles with their alternative north and south polarities to thereby generate a rotor magnetic field. Note that, as the rotor 4M, a rotor comprising permanent magnets or a salient-pole rotor for generating a rotating magnetic field can be used. The rotating magnetic field induces an AC voltage in each of the first and second stator windings 2 and 3.

The first rectifier-module assembly 5 is disposed between the first stator windings 2 and the battery 9, and is constructed as a three-phase full-wave rectifier (bridge circuit) as a whole. The first rectifier-module assembly 5 is operative to convert the AC voltage induced in the first stator windings 2 into a DC voltage.

Specifically, the first rectifier-module assembly 5 is comprised of a number of such as three, rectifier modules 5X, 5Y, and 5Z corresponding to the number of phase of the first stator windings 2. The rectifier module 5X is connected with the X-phase winding in the first stator windings 2, the rectifier module 5Y is connected with the Y-phase winding in the first stator windings 2, and the rectifier module 5Z is connected with the Z-phase winding in the first stator windings.

The second rectifier-module assembly 6 is disposed between the second stator windings 3 and the battery 9, and is constructed as a three-phase full-wave rectifier (bridge circuit) as a whole. The second rectifier-module assembly 6 is operative to convert the AC voltage induced in the second stator windings 3 into a DC voltage.

Specifically, the second rectifier-module assembly 6 is comprised of a number of, such as three, rectifier modules 6U, 6V, and 6Z corresponding to the number of phase of the second stator windings 3. The rectifier module 6U is connected with the U-phase winding in the second stator windings 3, the rectifier module 6V is connected with the V-phase winding in the second stator windings 3, and the rectifier module 6W is connected with the W-phase winding in the second stator windings 3.

The regulator 7 is connected with an ECU (external controller) 8 via its communication terminal and communication line. The regulator 7 is operative to carry out serial bidirectional communications, such as LIN (Local Interconnect Network) communications in accordance with LIN protocols, with the ECU 8, thus sending and/or receiving communication messages to and/or from the ECU 8.

The regulator 7 is designed to control a current to be supplied to the field winding 4, thus regulating the output voltage of the power generator 1 (an output voltage of each rectifier module) to a target regulated voltage Vreg fed from, for example, the ECU 8. For example, if the output voltage of the power generator 1 is higher than the target regulated voltage Vreg, the regulator 7 stops the supply of the current to the field winding 4, and, if the output voltage of the power generator 1 is lower than the target regulated voltage Vreg, the regulator 7 supplies the current to the field winding 4. This regulates the output voltage of the power generator 1 to the target regulated voltage Vreg.

For example, the regulator 7 includes a MOS transistor with a flywheel diode connected thereacross. The drain of the MOS transistor is connected with the output terminal of the power generator 1, and the source is connected with one end of the field winding 4; the other end of the field winding 4 is grounded. The regulator 7 is operative to generate a PWM signal consisting of the train of cyclic pulses, each width (on period, duty cycle) of which is determined depending on the compared result between the output voltage of the power generator 1 is higher than the target regulated voltage Vreg. That is, during the MOS transistor on, a current flows based on the output voltage $V_B$ through the field winding 4, and during the MOS transistor off, no current flows through the field winding 4. Thus, the amount (an averaged value) of a filed current flowing through the field winding 4 can be adjusted by the duty cycle, and therefore, the output voltage $V_B$ is feedback controlled based on the adjusted amount of the field current. The flywheel diode is operative to allow current based on charged energy in the field winding 4 after turnoff of the MOS transistor to be circulated therethrough.

Next, an example of the structure of the rectifier module 5X according to this embodiment will be fully described hereinafter.

Figure 2:
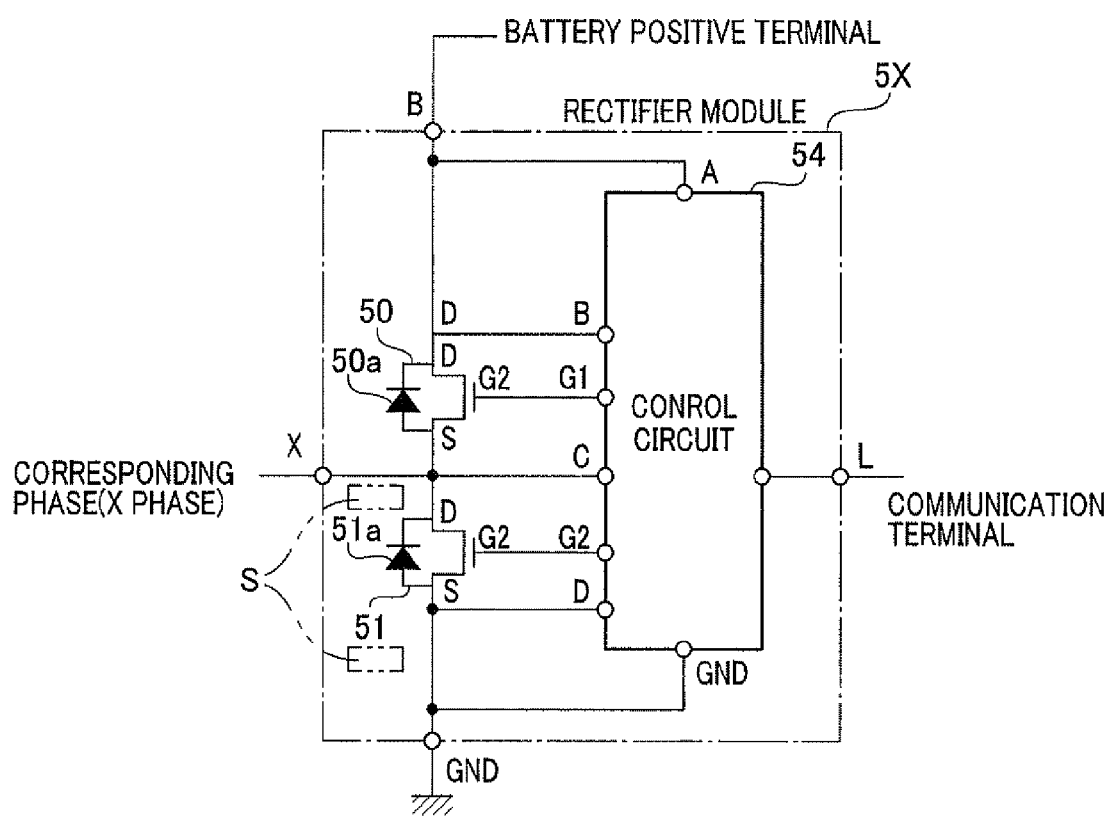
FIG. 2 is a circuit diagram schematically illustrating an example of the structure of a rectifier module illustrated in FIG. 1.

FIG. 2 schematically illustrates the structure of the rectifier module 5X according to this embodiment. Each of the other rectifier modules 5Y, 5Z, 6U, 6Y, and 6Z has the same structure as the rectifier module 5X. Referring to FIG. 2, the rectifier module 5X is comprised of a pair of MOS transistors 50 and 51, and a control circuit 54, and has terminals B, X, L, and GND.

The source S of the MOS transistor 50 is connected with a corresponding phase winding, such as the X-phase winding, of the first stator windings 2 via the terminal X, and the drain D is connected with the positive terminal of the battery 9 and the electric loads 10 via the charge line 12 and the terminal B of the rectifier module 5X. Thus, the MOS transistor 50 serves as a high-side (upper arm) switching element. An intrinsic diode (body diode) 50a is intrinsically provided in the MOS transistor 50 to be connected in parallel thereto. That is, the anode of the intrinsic diode 50a is connected with the source of the MOS transistor 50, and the cathode is connected with the drain thereof.

The drain D of the MOS transistor 51 is connected with a corresponding phase winding, such as the X-phase winding, of the first stator windings 2 via the terminal X and with the source S of the MOS transistor 50. The source S of the MOS transistor 51 is connected with the negative terminal of the battery 9 connected with a signal ground via the terminal GND. Thus, the MOS transistor 51 serves as a low-side (lower arm) switching element. An intrinsic diode (body diode) 51a is intrinsically provided in the MOS transistor 51 to be connected in parallel thereto. That is, the anode of the intrinsic diode 51a is connected with the source of the MOS transistor 51, and the cathode is connected with the drain thereof.

In other words, the high- and low-side MOS transistors 50 and 51 are connected with each other in series via a connecting point, and the X-phase winding of the first stator windings 2 is connected with the connecting point between the source S of the MOS transistor 50 and the drain D of the MOS transistor 51.

Note that an additional diode can be connected in parallel to each of the MOS transistors 50 and 51. A switching element with a type different from the MOS transistor type can be used as at least one of the MOS transistors 50 and 51. In this modification, a diode is added to be connected in parallel to the switching element.

FIG. 3 schematically illustrates an example of the structure of the control circuit 54 in detail. Referring to FIG. 3, the control circuit 54 includes a controller 100, a power source 102, an output voltage detector 110, an operating condition detector 120, an operating condition detector 130, a load-dump protection determiner 140, a temperature detector 150, drivers 170 and 172, and a communication circuit 180. The control circuit 54 has, for example, seven terminals A, B, C, D, G1, G2, L, and GND. The ground terminal GND is connected via the ground terminal GND of the rectifier module 5X with the signal ground.

The power source 102 is connected with the controller 100 and the terminal A; the terminal A is connected with the terminal B of the rectifier module 5X and the drain D of the MOS transistor 50. When the rotor 4M starts to turn by the rotation of the crankshaft of the engine so that an X-phase voltage is generated across the X-phase winding, the X-phase voltage is inputted to the power source 102 for example via the terminal C. Then, the power source 102 generates a substantially constant voltage based on, for example, the output voltage of the power generator 1, and supply the constant voltage as an operating voltage to each component included in the control circuit 54. These operating voltage generating operations are substantially identical to those of normal regulators.

The driver 170 is connected with the controller 100. The driver 170 has an output terminal corresponding to the terminal G1, and the output terminal G1 is connected with the gate G of the high-side MOS transistor 50. The driver 170 is operative to generate a drive signal with a preset gate-source voltage $V_{GS}$ to be applied to the gate of the high-side MOS transistor 50 for turning on and off the MOS transistor 50.

The driver 172 is connected with the controller 100. The driver 172 has an output terminal corresponding to the terminal G2, and the output terminal G2 is connected with the gate of the low-side MOS transistor 51. The driver 172 is operative to generate a drive signal having a preset gate-source voltage $V_{GS}$ to be applied to the gate of the low-side MOS transistor 51 for turning on and off the MOS transistor 51. For example, the drive signal to be outputted from each of the drivers 171 and 172 is a pulse signal with a controllable duty cycle, that is, the ratio, in percent, of a controllable pulse width or a controllable on time to a corresponding period (on time+off time).

The output voltage detector 110 is connected with the terminal A and with the controller 100. The output voltage driver 110 is comprised of a differential amplifier 110a and an A/D converter 110b. The input terminals of the differential amplifier 110a are connected with the signal ground and the terminal A. The output terminal of the differential amplifier 110a is connected with the input terminal of the A/D converter 110b. The differential amplifier 110a is operative to output the potential difference between the voltage (output voltage) at the positive terminal of the battery 9 connected with the output terminal B of the power generator 1 via the charge line 12 and the ground voltage. That is, the differential amplifier 110a outputs the voltage at the positive terminal of the battery 9 with the voltage little affected from noise as a battery voltage. The A/D converter 110b is operative to convert the battery voltage into digital data whose value corresponds to the battery voltage, and output, to the controller 100, the digital data. The A/D converter 110b can be provided in the controller 100.

The operating condition detector 120 is connected with the terminals B and C and the controller 100; the terminal B is connected with the drain D of the high-side MOS transistor 50. The operating condition detector 120 is comprised of a differential amplifier 120a and an A/D converter 120b. The input terminals of the differential amplifier 120a are connected with the drain D of the high-side MOS transistor 50 via the terminal C and the source S of the high-side MOS transistor 50 via the terminal B. The output terminal of the differential amplifier 120b is connected with the input terminal of the A/D converter 120b. The differential amplifier 120a is operative to output the voltage difference between the drain D and the source S of the high-side MOS transistor 50 as "drain-source voltage $V_{DS}$", in other words, the difference between the voltage at the terminal B and the voltage at the terminal C illustrated in FIGS. 2 and 3. The A/D converter 120b is operative to convert the drain-source voltage $V_{DS}$ into digital data whose value corresponds to the drain-source voltage $V_{DS}$, and output, to the controller 100, the digital data. The controller 100 is operative to receive the digital data, monitor the operating conditions of the MOS transistor 50 based on the digital data corresponding to the drain-source voltage, control the duty cycle of the MOS transistor 50 based on the monitored operating conditions, and determine whether there is a fault in the MOS transistor 50 based on the monitored operating conditions.

The operating condition detector 130 is connected with the terminal C and D and the controller 100; the terminal D is connected with the source S of the low-side MOS transistor 51. The operating condition detector 130 is comprised of a differential amplifier 130a and an A/D converter 130b. The input terminals of the differential amplifier 130a are connected with the drain D of the low-side MOS transistor 51 via the terminal C and the source S of the low-side MOS transistor 51 via the terminal D. The output terminal of the differential amplifier 130b is connected with the input terminal of the A/D converter 130b. The differential amplifier 130a is operative to output the voltage difference between the drain D an the source S of the low-side MOS transistor 51 as "drain-source voltage $V_{DS}$", in other words, the difference between the voltage at the terminal D and the voltage at the terminal C illustrated in FIGS. 2 and 3. The A/D converter 130b is operative to convert the drain-source voltage $V_{DS}$ into digital data whose value corresponds to the drain-source voltage $V_{DS}$, and output, to the controller 100, the digital data. The controller 100 is operative to receive the digital data, monitor the operating conditions of the MOS transistor 51 based on the digital data corresponding to the drain-source voltage, control the duty cycle of the MOS transistor 51 based on the monitored operating conditions, and determine whether there is a fault in the MOS transistor 51 based on the monitored operating conditions.

The load-dump protection determiner 140 is connected with the terminal B of the rectifier module 5X via the terminal A, and with the terminals C and D. The load dump-protection determiner 140 monitors the voltage $V_B$ at the output terminal B (the terminal A) of the power generator 1, that is, the battery voltage $V_B$ or the output voltage $V_B$ of the power generator 1. If the output voltage $V_B$ exceeds a first threshold voltage V1, such as 20 V, the load-dump protection determiner 140 outputs, to the controller 100, an instruction (protection start instruction) that instructs the controller 100 to operate in protection mode. Thereafter, if the output voltage $V_B$ drops to become lower than a second threshold voltage V2, such as 16.5 V lower than the first threshold voltage V1, the load-dump protection determiner 140 outputs, to the controller 100, an instruction (rectification restart instruction) that instructs the controller 100 to shift from the protection mode to rectifying mode to restart rectifying operations.

For example, the load-dump protection determiner 140 according to the first embodiment is designed as an analog circuit comprised of various active and passive elements in order to immediately perform its process.

The controller 100 is adapted to operate in the rectifying mode or the protection mode according to any one of the protection start instruction and the rectification restart instruction. The detailed structure of the load-dump protection determiner 140 and operations of the controller 100 in the protection mode and operations thereof during the shift from the protection mode to the rectifying mode will be described later.

The temperature detector 150 is connected with the controller 100. The temperature detector 150 is comprised of a constant current source 150a, a diode 150b, a differential amplifier 150c, and an A/D converter 150d. The input terminals of the differential amplifier 150c are connected with the respective anode and cathode of the diode 150b, and the output terminal is connected with the A/D converter 150d. The anode of the diode 150b is connected with the constant current source 150a. Thus, the differential amplifier 150c outputs a forward voltage drop across the diode 150b, which depends on temperature of the rectifier module 5X. The A/D converter 150d converts the forward voltage drop into digital data whose value corresponds to the forward voltage drop, and output, to the controller 100, the digital data. The controller 100 is operative to receive the digital data and detect the temperature of the rectifier module 5X based on the digital data. The temperature detector 150 can be provided in the controller 100.

The communication circuit 180 is connected with the controller 100 and the terminal L. Like the regulator 7, the communication circuit 180 is operative to carry out serial bidirectional communications, such as LIN (Local Interconnect Network) communications in accordance with LIN protocols, with the ECU 8 via the terminal L, thus sending and/or receiving communication messages to and/or from the ECU 8.

For example, each of the regulator 7 and the communication circuit 180 can transmit or receive one message frame to or from the ECU 8 at 20 ms (milliseconds). In other words, each of the regulator 7 and the communication circuit 180 can transmit or receive 50 message frames per second.

Thus, even if the number of message frames to be communicated between each of the rectifier modules is increased, the regulator 7 can transmit and/or receive, to and/or from the ECU 8, message frames including information indicative of the state of the generated output of the power generator 1 and/or diagnostic information without being affected from the communications between each rectifier module and the ECU 8.

Next, operations of the control circuit 54 of a rectifier module 5 in the protection mode and operations of the control circuit 54 of the rectifier module 5 during the shift from the protection mode to the rectifying mode will be described hereinafter.

Figure 4:
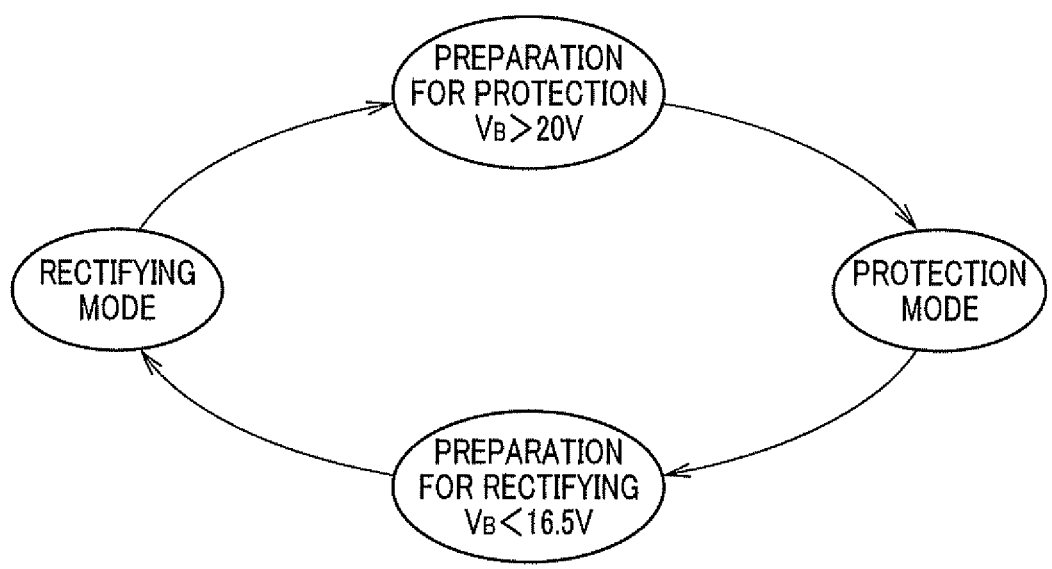
FIG. 4 is a view schematically illustrating mode transitions of the control circuit of a rectifier module according to the first embodiment.

FIG. 4 schematically illustrates mode transitions of the control circuit 54 of a rectifier module 5 according to the first embodiment. Specifically, if it is determined that load dump occurs during each control circuit 54 operating in the rectifying mode, the control circuit 54 of a rectifying module 5 for at least one phase winding across which a high voltage is generated due to the load dump prepares for the protection mode. Thereafter, the control circuit 54 shifts to the protection mode, and operates in the protection mode to decay the load dump voltage. Thereafter, the control circuit 54 prepares for the rectifying mode, and thereafter, operates in the rectifying mode.

(A) of FIG. 5 schematically illustrates an example of the waveform of a phase voltage Vx across a phase winding in the rectifying mode, and (B) of FIG. 5 schematically illustrates an example of the waveform of a high phase voltage generated across the phase winding due to load dump. In (A) and (B) of FIG. 5, reference character α represents the drain-source voltage $V_{DS}$ of each of the high- and low-side MOS transistors 50 and 51 in on state; this α is, for example, 0.1 V.

Referring to (A) of FIG. 5, in the rectifying mode with no load dump, when the X-phase voltage Vx across the X-phase winding exceeds the sum of the output voltage $V_B$ and the voltage α

The controller 100 of the control circuit 54 of the rectifier module 5X is operative to calculate the rotational speed of the rotor 4M of the power generator 1 based on the digital data indicative of the drain-source voltage $V_{DS}$ of each of the high- and low-side MOS transistors 50 and 51 outputted from a corresponding one of the operating condition detector 120 and 130. Then, the controller 100 is operative to determine, based on, for example, the rotational speed of the rotor 4M, that the corresponding upper arm is within a conductive period during which one phase current can flow through the upper arm (the high-side MOS transistor 50 or the diode 50a). Thus, the controller 100 of the rectifier module 5X turns on the high-side MOS transistor 50 through the driver 170 with the low-side MOS transistor 51 being off. This results in that the X-phase voltage Vx is clamped to substantially the sum of the output voltage $V_B$ and the voltage α (see a range A of one cycle of the X-phase voltage Vx in (A) of FIG. 5).

After the lapse of a preset time, the control circuit 54 of the rectifier module 5X determines that the X-phase voltage Vx is equal to or lower than the sum of the output voltage $V_B$ and the voltage α so that it is determined that the upper arm is out of the conductive period, then turning off the high-side MOS transistor 50 through the driver 170.

Thereafter, when the X-phase voltage Vx drops to be lower than the sum of the ground level (0 V) and −α, the control circuit 54 of the rectifier module 5X determines that the corresponding lower arm is within a conductive period during which one phase current can flow through the lower arm (the low-side MOS transistor 51 or the diode 51a). Thus, the control circuit 54 of the rectifier module 5X turns on the low-side MOS transistor 51 through the driver 172. This results in that the X-phase voltage Vx is clamped to substantially the sum of the ground level (0 V) and −α.

After the lapse of a preset time, the control circuit 54 of the rectifier module 5X determines that the X-phase voltage Vx is equal to or higher than the sum of the ground level (0 V) and −α so that it is determined that the lower arm is out of the conductive period, then turning off the low-side MOS transistor 51 through the driver 172.

Each of the remaining rectifier modules 5Y, 5Z, 6U, 6V, and 6Z can perform these on and off drives of a corresponding pair of high- and low-side MOS transistors 50 and 51.

These on and off operations of the MOS transistors 50 and 51 by a rectifier module carry out synchronous rectification of three-phase AC voltages induced in a corresponding one of the first and second stator windings 2 and 3.

During the synchronous rectification being performed in the rectifying mode, the disconnection between the output terminal of the power generator 1 and the charge line 12 or that between the positive terminal of the battery 9 and the charge line 12 causes load dump, that is, the disconnection of the powered stator winding from the battery 9 with the corresponding high-side MOS transistor 50 on and the corresponding low-side MOS transistor 51 off. The load dump causes a high voltage across a corresponding at least one stator winding due to its large impedance (see reference character $V_{LD}$ in (B) of FIG. 5). The phase voltage $V_{LD}$ due to load dump is higher than the output voltage $V_B$, for example, is equal to or higher than 100 V. Thus, the control circuit 54 of a rectifier module corresponding to the at least one stator winding causing the phase voltage $V_{LD}$ prepares for the protection mode, and thereafter, shifts to the protection mode to protect at least some elements in the power generator 1, such as the rectifying modules, the regulator 7, and the electrical loads 10.

Specifically, the control circuit 54 shifts to a process of protection against load dump when a corresponding phase voltage exceeds the first threshold voltage V1. Assuming that the battery 9 is a lead acid battery having a rated voltage of 12 V (in other words, the power generator 1 is a 12-V electrical system), the first threshold voltage is set to 20 V. The first threshold voltage V1 can be set to a value where there are no abnormalities, such as faults, in the electrical loads 10 so that, even if the output voltage rose close to the first threshold voltage V1, the electrical loads 10 would operate normally.

Specifically, when the phase voltage of at least one stator winding due to load dump exceeds 20 V, the control circuit 54 of a rectifier module corresponding to the at least one stator winding prepares for the protection mode. That is, the load-dump protection determiner 140 of the control circuit 54 is designed to determine an appropriate timing at which the controller 100 shifts to the protection mode, and instruct, at the determined appropriate timing, the controller 100 to start load-dump protection in the protection mode.

The controller 100 of a rectifier module corresponding to the at least one stator winding in the protection mode turns on the low-side MOS transistor 51, and simultaneously turns off or keeps off the high-side MOS transistor 50.

The on state of the low-side MOS transistor 51 and the off state of the high-side MOS transistor 50 clamp the phase voltage across the at least one stator winding to the sum of the ground level (0 V) and α (0.1 V) when the phase voltage across the at least one stator winding rises to α (0.1 V), and clamp the phase voltage across the at least one stator winding to the sum of the ground level (0 V) and −α (−0.1 V) when the phase voltage across the at least one stator winding falls to −α (−0.1 V).

That is, during the protection mode, the phase voltage across the at least one stator winding due to load dump cyclically varies within the range from −α (−0.1 V) to α (0.1 V).

As described above, during the rectifying mode, the high-side MOS transistor 50 is on with the low-side MOS transistor 51 being off within the range A in (A) of FIG. 5. Thus, within the range A, when the high-side switching element 50 in on state and the low-side MOS transistor 51 in off state are instantaneously switched off and on, respectively, there is a risk of a surge being generated across the corresponding phase winding. For example, because actually switched timings from on to off and vice versa of each of the MOS transistors 50 and 51 vary between each other, if the high-side MOS transistor 50 in on state were switched off slightly earlier than the low-side MOS transistor 51 in off state being switched on, current flowing through the corresponding phase winding and through the high-side MOS transistor 50 would be instantaneously interrupted, resulting in a surge across the corresponding phase winding.

In addition, within each of ranges B illustrated in FIG. 5, because there is a potential difference between the source and drain of the low-side switching element 51 although no current flows through the corresponding phase winding, a large phase current may be instantaneously generated when the low-side MOS transistor 51 is switched on, resulting in a large surge across the corresponding winding against the change of the phase current.

As described above, if the controller 100 of a rectifier module 5 or 6 corresponding to at least one phase winding across which a high voltage is generated due to load dump shifted to the protection mode within a range A or B in FIG. 5, a large surge would be generated across the corresponding phase winding. Thus, a corresponding rectifier module 5 or 6 according to the first embodiment is configured to shift to the protection mode after checking that the phase voltage $V_{LD}$ across the corresponding phase winding is within a range C illustrated in FIG. 5. In other words, a corresponding rectifier module 5 or 6 according to the first embodiment is configured to wait for shift to the protection mode until the phase voltage $V_{LD}$ across the corresponding phase winding is within a range C illustrated in FIG. 5. Within the range C, the low-side MOS transistor 51 is designed to be on in the rectifying mode.

That is, the load-dump protection determiner 140 of the corresponding rectifier module 5 or 6 according to the first embodiment is configured to determine an appropriate timing to shift to the protection mode when the phase voltage $V_{LD}$ across the corresponding phase winding is within the range C because, within the range C, current continuously flows into the corresponding phase winding through the low-side switching element 51. The controller 100 of a rectifier module corresponding to the at least one stator winding turns on the low-side MOS transistor 51, and simultaneously turns off or keeps off the high-side MOS transistor 50.

On the other hand, after decaying a high voltage due to load dump in the protection mode, the control circuit 54 of a rectifier module corresponding to the load dump prepares for the rectifying mode, and thereafter, shifts to the rectifying mode.

Specifically, when the phase voltage of at least one stator winding due to load dump falls below 16.5 V, the control circuit 54 of a rectifier module corresponding to the at least one stator winding prepares for the rectifying mode. That is, the load-dump protection determiner 140 of the control circuit 54 is designed to determine an appropriate timing at which the controller 100 shifts to the rectifying mode, and instruct, at the determined appropriate timing, the controller 100 to start rectifying operations with prevention of the occurrence of a surge during the mode shift to the rectifying mode from the protection mode.

The controller 100 of a rectifier module corresponding to the at least one stator winding in the rectifying mode turns off the low-side MOS transistor 51, and thereafter, carries out synchronous rectification of a three-phase AC voltage induced in a corresponding one of the first and second stator windings 2 and 3 set forth above.

As described above, during the protection mode, the low-side MOS transistor 51 is continuously on so that a phase voltage Vp is generated as illustrated in (B) of FIG. 5. Within a range A or B, turnoff of the low-side MOS transistor 51 causes instantaneous interruption of a large phase current flowing from the corresponding phase winding through the low-side MOS transistor 51, resulting in a surge across a corresponding phase winding. Thus, a corresponding rectifier module 5 or 6 according to the first embodiment is configured to shift to the rectifying mode after checking that the phase voltage Vp across the corresponding phase winding is within a range C illustrated in FIG. 5. In other words, a corresponding rectifier module 5 or 6 according to the first embodiment is configured to wait for shift to the rectifying mode until the phase voltage Vp across the corresponding phase winding is within a range C illustrated in FIG. 5. That is, the load-dump protection determiner 140 of the corresponding rectifier module 5 or 6 according to the first embodiment is configured to determine a suitable timing to shift to the rectifying mode when the phase voltage Vp across the corresponding phase winding is within the range C. This is because: in the protection mode, a current flows through the low-side switching element 51 into the corresponding phase winding in the same direction as the forward direction of the diode 51a within the range C, and, in the rectifying mode, a current continuously flows through the diode 51a even if the low-side MOS transistor 51 is off.

Next, the detailed structure of the load-dump protection determiner 140 of each of the rectifier modules 5 and 6 will be described hereinafter.

As illustrated in FIG. 6, the load-dump protection determiner 140 includes an output voltage detector 141, a threshold voltage determiner 142, a MOS voltage detector 143, a current-flow direction detector 144, a timing determiner 145, and a timing determiner 146.

The output voltage detector 141 is connected with the output terminal B via the terminal A, and operative to detect the output voltage $V_B$. The threshold voltage determiner 142 is connected with the output voltage detector 141, and operative to receive the output voltage $V_B$ from the output voltage detector 141. The threshold voltage determiner 142 is also operative to determine whether the output voltage $V_B$ exceeds the first threshold voltage V1. In addition, once the output voltage $V_B$ exceeded the first threshold voltage V1, the threshold voltage determiner 142 is operative to determine whether the output voltage $V_B$ falls below the second threshold voltage V2.

FIG. 7 schematically illustrates a relationship between the output voltage $V_B$ and a result of the determination by the threshold voltage determiner 142. In FIG. 7, the horizontal axis represents the output voltage $V_B$ and the vertical axis represents a result of the determination by the threshold voltage determiner 142. Referring to FIG. 7, the threshold voltage determiner 142 outputs an electric signal with a low level (L), such as a voltage with a low level, while the output voltage $V_B$ is equal to or lower than the first threshold voltage V1. If the output voltage $V_B$ exceeds the first threshold voltage V1, the threshold voltage determiner 142 switches its output from the low level signal to an electric signal with a high level (H) higher than the low level, such as a voltage with a high level higher than the low level.

Once the output voltage $V_B$ exceeded the first threshold V1, if the output voltage $V_B$ falls below the second threshold voltage V2, the threshold voltage determiner 142 switches its output from the high level signal to the low level signal.

The MOS voltage detector 143 is connected with the terminals C and D, and with the current-flow direction detector 144. The MOS voltage detector 143 is operative to detect the drain-source voltage $V_{DS}$ of the low-side MOS transistor 51, that is, the potential difference between the terminal C and the terminal D. The current-flow direction detector 144 is operative to receive the drain-source voltage $V_{DS}$ of the low-side MOS transistor 51 from the MOS voltage detector 143, and to determine, based on the drain-source voltage $V_{DS}$ of the low-side MOS transistor 51, the direction of current through the low-side MOS transistor 51 if the MOS transistor 51 is turned on.

Specifically, before shift to the protection mode from the rectifying mode after the occurrence of load dump, a corresponding phase voltage $V_{LD}$ due to the load dump within the range A or each range B is equal to or higher than 0 V. Thus, determination of whether the phase voltage $V_{LD}$, that is, the drain-source voltage $V_{DS}$ of the low-side MOS transistor 51 is lower than a preset reference voltage $V_{REF}$ defined to be lower than 0 V and higher than −0.1 V allows determination of whether the phase voltage $V_{LD}$ is within a range C, that is, whether current flows through the MOS transistor 51 in the direction opposite to the forward direction of the diode 51a connected parallel to the MOS transistor 51.

That is, the drain-source voltage $V_{DS}$ of the low-side MOS transistor 51 lower than the reference voltage $V_{REF}$ shows that the phase voltage $V_{LD}$ is within the range C, so that the current-flow direction detector 144 outputs the high level signal.

Actually, it may be difficult to detect the drain-source voltage $V_{DS}$ within the voltage range from −0.1 V to +0.1 V with high accuracy, and to compare the phase voltage $V_{LD}$ with the reference voltage $V_{REF}$ with high accuracy. For this reason, the MOS voltage detector 143 is operative to amplify the detected drain-source voltage $V_{DS}$ with a predetermined gain to convert in level the drain-source voltage $V_{DS}$ into a drain-source voltage $V_{DS}'$, and output the drain-source voltage $V_{DS}'$ to the current-flow direction detector 144. The current-flow direction detector 144 is operative to receive the drain-source voltage $V_{DS}'$, and to compare the drain-source voltage $V_{DS}'$ with a reference voltage $V_{REF}'$ whose level is converted from the reference voltage $V_{REF}$ in the same manner as the conversion of the drain-source voltage $V_{DS}$ into the drain-source voltage $V_{DS}'$.

FIG. 8 schematically illustrates a relationship between the drain-source voltage $V_{DS}'$ and the reference voltage $V_{REF}'$. In FIG. 8, the vertical axis represents the converted drain-source voltage $V_{DS}'$, and the horizontal axis represents the drain-source voltage $V_{DS}$. In order to detect the drain-source voltage $V_{DS}$ within the voltage range from −0.1 V to +0.1 V with high accuracy, the voltage range from −0.1 V to +0.1 V is amplified by 20-fold. As an example illustrated in FIG. 8, −0.1 V corresponds to 0 V, +0.1 V corresponds to +5 V, the intermediate (0 V) in the voltage range from −0.1 V to +0.1 V corresponds to +2.5 V, and the voltage range from −0.1 V to +0.1 V corresponds to the voltage range from 0 V to +5 V. Thus, the reference voltage $V_{REF}'$ is set to be lower than 2.5 V and higher than 0 V.

As illustrated in FIG. 8, because, in the protection mode, if the drain-source voltage $V_{DS}$ exceeds +0.1 V or falls from −0.1 V, the drain-source voltage $V_{DS}$ is clamped to +0.1 V or −0.1 V. Thus, the output of the MOS voltage detector 143 is clamped to +5 V if the drain-source voltage $V_{DS}$ exceeds +0.1 V, or clamped to 0 V if the drain-source voltage $V_{DS}$ falls from −0.1 V. Note that, before shift to the protection mode from the rectifying mode after the occurrence of load dump, a corresponding phase voltage $V_{LD}$ due to the load dump within the range C is lower than 0.1 V. Thus, in order to more accurately detect the timing just when the drain-source voltage $V_{DS}$ of the low-side MOS transistor 51 enters in the range C, the reference voltage $V_{REF}'$ need be set to be slightly lower than +5 V.

The current-flow direction detector 144 is operative to receive the drain-source voltage $V_{DS}'$ from the MOS voltage detector 143, compare the drain-source voltage $V_{DS}'$ with the reference voltage $V_{REF}'$, and output a high level signal if the drain-source voltage $V_{DS}'$ is lower than the reference voltage $V_{REF}'$ or output a low level signal if the drain-source voltage $V_{DS}'$ is higher than the reference voltage $V_{REF}'$. That is, the current-flow direction determiner 144 is operative to determine the timing at which the drain-source voltage $V_{DS}'$ is lower than the reference voltage $V_{REF}'$, in other words, the drain-source voltage $V_{DS}$ is lower than the reference voltage $V_{REF}$ of 0 V. Thus, the current-flow direction determiner 144 can reliably and easily detect the direction of current flowing through the low-side MOS transistor 51 without using current sensors, such as shunt resistors.

Note that the current-flow direction detector 144 can be operative to delay a timing to switch its output from the low level to the high level by a preset period. LC (Inductance and capacitance) components in a rectifier module 5 or 6 can cause a phase difference between a corresponding detected drain-source voltage $V_{DS}$ and a corresponding current actually flowing through the drain-source of a corresponding MOS transistor 51. Specifically, a current higher than 0 amperes [A] can flow through a MOS transistor 51 of a rectifier module 5 or 6 although a corresponding detected drain-source voltage $V_{DS}$ is 0 V. In order to address such cases, the current-flow direction detector 144 can delay a timing to switch its output from the low level to the high level by a preset period. As the preset period, a period corresponding to a quarter (¼) of the cycle of a phase voltage (induced voltage) corresponding to a phase winding can be for example used.

The timing determiner 145 is connected with each of the threshold voltage determiner 142 and the current-flow direction detector 144. The timing determiner 145 is operative to change its output from a low level signal to a high level signal if the output of the current-flow direction detector 144 is changed from the low level signal to the high level signal after change of the output of the threshold voltage determiner 142 from the low level signal to the high level signal. That is, the timing determiner 145 is operative to output the high level signal if the output voltage $V_B$ is higher than the first threshold voltage V1 due to the occurrence of load dump, and the drain-source voltage $V_{DS}$ of the low-side MOS transistor 51 is within the range C illustrated in (B) of FIG. 5. The output of the high level signal form the timing determiner 145 represents the instruction (protection start instruction), and is inputted to the controller 100. In response to the input of the protection start instruction, the controller 100 shifts to the protection mode. Then, the controller 100 drives the driver 170 to turn off the high-side MOS transistor 50, and the driver 172 to turn on the MOS transistor 51 in the protection mode, thus starting protection operations against a high voltage due to load dump.

The timing determiner 146 is connected with each of the threshold voltage determiner 142 and the current-flow direction detector 144. The timing determiner 146 is operative to change its output from a low level signal to a high level signal if the output of the current-flow direction detector 144 is changed from the low level signal to the high level signal after change of the output of the threshold voltage determiner 142 from the high level signal to the low level signal. That is, the timing determiner 146 is operative to output the high level signal if the output voltage $V_B$ is lower than the second threshold voltage V2 once the output voltage $V_B$ exceeded the first voltage V1 due to the occurrence of load dump, and the drain-source voltage $V_{DS}$ of the low-side MOS transistor 51 is within the range C illustrated in (B) of FIG. 5. The output of the high level signal form the timing determiner 146 represents the instruction (rectification restart instruction), and is inputted to the controller 100. In response to the input of the rectification restart instruction, the controller 100 shifts to the rectifying mode. Then, the controller 100 drives the driver 172 to turn off the MOS transistor 51 in the rectifying mode, thus starting synchronous rectification of corresponding three-phase AC voltages.

Note that delaying a switching timing of the output of the current-flow direction determiner 144 from the low level to the high level aims to set an appropriate timing at which the controller 100 shifts to the protection mode or the rectifying mode to be a substantially midpoint of the range C illustrated in (B) of FIG. 5. This delaying function can be installed in each of the timing determiners 145 and 146. The delaying function can be installed in at least one of the timing determiners 145 and 146, and the at least one of the timing determiners 145 and 146 can delay a switching timing of the output of the current-flow direction detector 144 from the low level to the high level.

In addition, the threshold voltage determiner 142 includes a threshold voltage determiner 142A. The threshold voltage setter 142A is operative to set the threshold voltage V2 to a value higher than the target regulated voltage Vreg or equal to or lower than the target regulated voltage Vreg according to, for example, the amount of current flowing through the low-side MOS transistor 51. The threshold voltage determiner 142A can be installed in the controller 100, or can be provided separately from the load-dump protection determiner 142 and the controller 100.

Next, the setting of the threshold voltage V2 to a value higher than the target regulated voltage Vreg will be described hereinafter.

If the positive terminal of the battery 9 and the charge line 12 are disconnected, the controller 140 shifts to the protection mode when the output voltage $V_B$ of the power generator 1 is higher than the first threshold voltage V1. However, because such a surge in the output voltage $V_B$ is transitory, it is necessary to supply operating power to the electrical loads 10 immediately after cancel of the protection mode. In view of these circumstances, the threshold voltage deter miner 142A is designed to set the second threshold voltage V2 to be higher than the target regulated voltage Vreg. This allows, immediately after reset of the protection mode, the regulator 7 to start the supply of current to the field winding 4 and, simultaneously, a corresponding rectifier module 5 or 6 to restart rectifying operations. Thus, it is possible to continuously supply stable operating power to the electrical loads 10 immediately after reset of the protection mode.

Next, the setting of the second threshold voltage V2 to a value equal to or lower than the target regulated voltage Vreg will be described hereinafter.

The setting of the second threshold voltage V2 to a value equal to or lower than the target regulated voltage Vreg results in that the supply of current to the field winding 4 is started before the output voltage $V_B$, which exceeded the first voltage V1 once due to the occurrence of load dump, is reduced to be below the second threshold voltage V2 so that the protection mode is reset. The low-side MOS transistor 51 is on before reset of the protection mode. For this reason, even if new alternating-current electromotive force is generated across one phase stator winding 2 corresponding to the low-side MOS transistor 51 based on the supplied current to the field winding 4, power based on the alternating-current electromotive force may be merely consumed through the low-side MOS transistor 51 so that the setting of the second threshold voltage V2 to a value equal to or lower than the target regulated voltage Vreg may be ineffective.

However, the setting of the second threshold voltage V2 to a value equal to or lower than the target regulated voltage Vreg enables a field current to flow through the field winding 4 before reset of the protection mode, resulting in an increase of a current flowing through the low-side MOS transistor 51 whose drain-source voltage $V_{DS}$ is to be detected by the MOS voltage detector 143. The increase of the field current flowing through the low-side MOS transistor 51 allows determination of the direction of the current through the low-side MOS transistor 51 with a high accuracy.

For example, if the amount of a field current flowing through the field winding 4 were 0 A with a phase current through each of the stator windings 2 and 3 being substantially 0 A at the point of time when the output voltage $V_B$ is below the second threshold voltage, no current would flow between the drain and source of each of the low-side MOS transistors 51. This would reduce the drain-source voltage $V_{DS}$, resulting in that the current-flow direction detector 144 would not determine the direction of current through the low-side MOS transistor 51 depending on the reference voltage $V_{REF}'$.

However, as described above, the setting of the second threshold voltage V2 to a value equal to or lower than the target regulated voltage Vreg allows a current to flow through each of the low-side MOS transistors 51 before the arrival of the output voltage $V_B$, which exceeded once the first threshold V1, to the second threshold voltage V2. This makes it possible to accurately determine the direction of a current flowing through the low-side MOS transistor 51.

Note that, in order to continuously supply stable operating power to the electrical loads 10, the second threshold voltage V2 can be set to be equal to or higher than a minimum voltage that can ensure normal operations of each of the electrical loads 10. As described above, the supply of current to the field winding 4 during the protection mode may not contribute to power supply to the electrical loads 10. Thus, it is preferable that the second threshold voltage V2 is set to be closer to the target regulated voltage Vreg. For this reason, the second threshold voltage V2 can be set to be a value that allows the regulator 7 to supply, to the field winding 4, a minimum current required to detect the drain-source voltage $V_{DS}$ of the low-side MOS transistor 51; this minimum current can be set to be equal to an initial exciting current of, for example, 0.5 A or therearound. This results in that the threshold voltage determiner 142A can set the second threshold voltage V2 to be lower than the target regulated voltage Vreg without communicating with the regulator 7.

The setting of the second threshold voltage V2 to one of a value equal to or lower than the target regulated voltage Vreg and a value higher than the target regulated voltage Vreg may reset the protection mode before the output voltage $V_B$ drops sufficiently, so that a corresponding high-side MOS transistor 50 may be turned on. This may result in that the output voltage $V_B$ rises again to reach the first threshold voltage V1 so that the controller 100 shifts to the protection mode, and operates in the protection mode if magnetic energy generated across a corresponding phase winding due to load dump does not sufficiently decay. Thus, the control circuit 54 of a corresponding rectifier module 5 or 6 repeatedly performs, at several times, a set of load-dump protecting operations in the protection mode and cancelling operations of the protection mode.

FIG. 9 schematically illustrates the variation of the output voltage $V_B$, the variation of the determined result of the threshold voltage determiner 142, and the variation of a field current If flowing through the field winding 4 if the second threshold voltage V2 is set to a value higher than the target regulated voltage Vreg so that the protection mode is cancelled with the output voltage $V_B$ being higher than the target regulated voltage Vreg. Referring to each of FIG. 9 and FIG. 10 described later, reference character "H" represents the high level of the output of the threshold voltage determiner 142, reference character "L" represents the low level of the output of the threshold voltage determiner 142, and reference character "If" represents the field current flowing through the field winding 4. The horizontal axis (t) of each graph illustrated in FIG. 9 represents elapsed time.

As illustrated in FIG. 9, if magnetic energy generated across a phase winding 2 or 3 due to load dump does not sufficiently decay, the control circuit 54 of a corresponding rectifier module 5 or 6 repeatedly performs, at several times (for example, four times in FIG. 9), the set of load-dump protecting operations in the protection mode and cancelling operations of the protection mode until the magnetic energy sufficiently decays. Because the second threshold voltage V2 is set to be higher than the target regulated voltage Vreg, the output voltage $V_B$ is maintained to be higher than the target regulated voltage Vreg during repetitions of the load-dump protecting operations and the cancelling operations of the protection mode. Thus, the field current If is gradually reduced because of no supply of current from the regulator 7.

FIG. 10 schematically illustrates the variation of the output voltage $V_B$, the variation of the determined result of the threshold voltage determiner 142, and the variation of a field current If flowing through the field winding 4 if the second threshold voltage V2 is set to a value equal to or lower than the target regulated voltage Vreg so that the protection mode is cancelled with the output voltage $V_B$ being equal to or lower than the target regulated voltage Vreg.

As illustrated in FIG. 10, if magnetic energy generated across a phase winding 2 or 3 due to load dump does not sufficiently decay, the control circuit 54 of a corresponding rectifier module 5 or 6 repeatedly performs, at several times (for example, five times in FIG. 10), the set of load-dump protecting operations in the protection mode and cancelling operations of the protection mode until the magnetic energy sufficiently decays. Because the second threshold voltage V2 is set to be equal to or lower than the target regulated voltage Vreg, the output voltage $V_B$ becomes repeatedly below the target regulated voltage Vreg for a short period before cancelling of the protection mode. Thus, the supply of current to the field winding 4 from the regulator 7 is repeatedly restarted for the short period, so that the field current If is slightly increased for each of the short periods.

As described above, the power generator 1 according to the first embodiment is configured to set the second threshold voltage V2 for cancelling the protection mode to either a value higher than the target regulated voltage Vreg or a value equal to or lower than the target regulated voltage Vreg.

The setting of the second threshold voltage V2 to a value higher than the target regulated voltage Vreg allows the output voltage $V_B$ of the power generator 1 to be equal to or higher than the target regulated voltage Vreg during repetitions of the load-dump protecting operations and the cancelling operations of the protection mode. Thus, even if there is load dump, it is possible to continuously supply operating power to the electrical loads 10 connected with the power generator 1. In addition, irrespective of repetitions of the cancelling of the protection mode, it is possible to determine an appropriate timing of each cancelling; the determined appropriate timing prevents or reduces a surge. Thus, the power generator 1 reduces the rising of the output voltage due to a surge, thus making stable the repeated load-dump protecting operations.

The setting of the second threshold voltage V2 to a value equal to or lower than the target regulated voltage Vreg allows a field current flowing through the field winding 4 at the cancel of the protection mode to increase. The increase in the field current flowing through the field winding 4 increases current flowing through each of the stator windings 2 and 3. This results in an increase of current flowing through a corresponding low-side MOS transistor 51. The increase of current flowing through the corresponding low-side MOS transistor 51 allows the current-flow direction detector 144 to easily determine the direction of current-flow through the corresponding low-side MOS transistor 51. This makes it possible to easily determine an appropriate timing of cancelling the protection mode suitable for prevention or reduction of a surge. Thus, irrespective of repetitions of the cancelling of the protection mode, it is possible to determine an appropriate timing of each cancelling; the determined appropriate timing prevents or reduces a surge. Thus, the power generator 1 reduces the rising of the output voltage due to a surge, thus making stable the repeated load-dump protecting operations.

In addition, the power generator 1 according to the first embodiment is configured to determine an appropriate timing of shifting to the protection mode due to the occurrence of load dump; the determined appropriate timing prevents or reduces a surge. Thus, the power generator 1 shifts to the protection mode, and starts protection operations against the load dump at the appropriate timing at which a surge is not generated. In addition, the power generator 1 repeats the set of the load-dump protecting operations and the cancelling operations of the protection mode. This results in that magnetic energy generated across a corresponding phase winding 2 or 3 due to load dump stably decays, and that the output voltage $V_B$ is maintained to be at least a value that enables the electrical loads 10 to normally operate.

The power generator 1 according to the first embodiment determines an appropriate timing of turning off a low-side MOS transistor 51 for preventing the occurrence of a surge set forth above, a timing at which no current flows from a corresponding phase winding to the low-side MOS transistor 51, that is, a timing at which the corresponding phase voltage is not included within the ranges A and B illustrated in FIG. 5. This prevents instantaneous interruption or immediate change of current flowing through the corresponding phase winding connected to the low-side MOS transistor 51 that is switched from off to on or on to off, making it possible to prevent the occurrence of a high surge across the corresponding phase winding.

Because the low-side MOS transistor 51 has a predetermined drain-source voltage $V_{DS}$ even if it is on, the power generator 1 according to the first embodiment detects the drain-source voltage $V_{DS}$ of the low-side MOS transistor 51 in on state, and determines the direction of current-flow through the low-side MOS transistor 51 based on the detected drain-source voltage $V_{DS}$. Thus, the power generator 1 determines appropriate timings of the shift from the protection mode to the rectifying mode and the shift from the rectifying mode to the protection mode; each of these timings reliably prevents the occurrence of a surge during a corresponding mode shift.

Moreover, the power generator 1 is configured to determine an appropriate timing of turning off or on the low-side MOS transistor 51 for each of phase windings. This configuration cancels the protection mode at an appropriate timing for each phase winding, and shifts to the protection mode at an appropriate timing for each phase winding. Thus, it is possible to reliably prevent the occurrence of a surge across each phase winding.

As described above, the power generator 1 according to the first embodiment is configured to determine an appropriate timing of shifting to the protection mode for each rectifier module. Thus, only one rectifier module corresponding to one phase winding can shift to the protection mode depending on: the cause of the occurrence of load dump, such as the disconnection of the output terminal of the power generator 1 and the disconnection of the positive terminal of the battery 9, or the amount of a phase current flowing through at least one of the stator windings at the occurrence of load dump.

Let us assume that, for the first stator windings 2, the rectifier module 5X only shifts to the protection mode while the rectifier modules 5Y and 5Z do not shift to the protection mode. In this assumption, during the protection mode, the low-side MOS transistor 51 of the rectifier module 5X is only turned on with the low-side MOS transistors 51 of the other rectifier modules 5Y and 5Z being kept off. For this reason, in the lower arm (low-side) of each of the rectifier modules 5Y and 5Z, current flows only through the corresponding transistor 51a. This results in that no current flows through the low-side MOS transistor 51 in the direction from the drain to the source, that is, in the direction from the MOS transistor 51 to the X-phase winding, which may cause the drain-source voltage $V_{DS}$ of the low-side MOS transistor 51 to be equal to or higher than 0 V.

FIG. 11 is a graph schematically illustrating the output of the MOS voltage detector 143 if only one rectifier module for one of the first and second stator windings 2 and 3 shifts to the protection mode while the other rectifier modules do not shift to the protection mode. Referring to FIG. 11, when the output voltage $V_B$ is higher than the first threshold voltage V1 so that the one rectifier module shifts to the protection mode at time t0, the output voltage $V_{DS}'$ from the MOS voltage detector 143 constantly maintains 2.5 V corresponding to the drain-source voltage $V_{DS}$ of 0 V or more. Thus, as illustrated in FIG. 11, the reference voltage $V_{REF}'$ used by the current-flow direction detector 144 can be replaced with a reference voltage $V_{REF}''$ higher than the reference voltage $V_{REF}'$. This replacement allows the current-flow direction detector 144 to reliably detect that the drain-source voltage $V_{DS}'$ is lower than the reference voltage $V_{REF}'''$, and output the high level signal to each of the timing determiners 145 and 146. Thus, even if only one rectifier module shifts to the protection mode so that the output voltage $V_B$, which exceeded the first threshold voltage V1 once, falls below the second threshold voltage V2, it is possible for the only one rectifier module to shift to the rectifying mode.

Only one rectifier module, such as a rectifier module 5X, can carry out load-dump protection in the protection mode when the other rectifier modules, such as rectifier modules 5Y and 5Z, cancel the protection mode to shift to the rectifying mode. Specifically, each of the three rectifier modules for one of the first and second stator windings 2 and 3 is configured to individually determine an appropriate timing of shifting to the rectifying mode. Thus, after two of the three rectifier modules have cancelled the protection mode, only one rectifier module corresponding to one phase winding maintains the protection mode. In this case, the drain-source voltage $V_{DS}$ of the low-side MOS transistor 51 of the only one rectifier module may not be lower than 0 V.

However, even in this case, because the output voltage $V_B$ has been lower than the second threshold voltage V2, it is possible for the only one rectifier module to shift to the rectifying mode at an appropriate timing within the range C. For example, during all three rectifier modules for one set of three-phase stator windings operating in the protection mode, the output of the current-flow direction detector 144 is alternately switched high and low, and a shift timing from the low level to the high level corresponds to the left edge of the range C or thereabout. The rotational speed of the rotor 4M before and after cancelling the protection mode can be substantially constant. Thus, the timing determiner 146 can be configured to detect and hold the cycle T of the change of output of the current-flow direction detector 144 from the low level to the high level. The timing determiner 146 also can be configured to detect a point of time at which the cycle T or an integral multiple of the cycle T, such as 2T, has elapsed since the change timing of the output of the current-flow direction detector 144 from the low level to the high level immediately before the drop of the output voltage $V_B$ from the second threshold voltage V2; this change timing is a point of time at which the drain-source voltage $V_{DS}'$ falls from the reference voltage $V_{REF}'$. Then, the timing determiner 146 can be configured to change the output of the timing determiner 146 from the low level to the high level at the detected point of time, thus outputting the rectification restart instruction to the controller 100.

The power generator 1 according to the first embodiment is configured to stop the supply of current to the field winding 4 from the regulator 7 during the protection mode if the second threshold voltage V2 is set to be higher than the target regulated voltage Vreg, but the power generator 1 can be configured to supply a constant current to the field winding 4 from the regulator 7 during the protection mode.

FIG. 12 schematically illustrates the variation of the output voltage $V_B$, the variation of the determined result of the threshold voltage determiner 142, and the variation of a field current If flowing through the field winding 4 if: the second threshold voltage V2 is set to a value higher than the target regulated voltage Vreg so that the protection mode is cancelled with the output voltage $V_B$ being higher than the target regulated voltage Vreg, and a constant current is forcibly supplied to the field winding during the protection mode. Reference characters illustrated in FIG. 12 are identical to corresponding reference characters illustrated in FIG. 9.

As illustrated in FIG. 12, a predetermined constant current (a current to be detected) $If_{min}$ is supplied from the regulator 7 to the field winding 4 during repetitions of the load-dump protecting operations and the cancelling operations of the protection mode. This increases a current flowing through each of the stator windings 2 and 3 at the cancel of the protection mode, thus increasing a current flowing through a corresponding low-side MOS transistor 51. This makes it possible to easily determine an appropriate timing of shifting to the rectifying mode to prevent the occurrence of a surge. The current $If_{min}$ to be supplied from the regulator 7 to the field winding 4 is preferably set to be as low as possible. For example, as the current $If_{min}$, a minimum current required to detect the drain-source voltage $V_{DS}$ of the low-side MOS transistor 51, which is equal to the initial exciting current of for example, 0.5 A or thereabound, can be used.

Specifically, the controller 100 of a corresponding rectifier module 5 or 6 is configured to send, to the regulator 7 via the communication circuit 180, a signal indicative of each of the timings (t1, t2, . . . , t8 illustrated in FIG. 12) at which the output level of the threshold voltage deter miner 142 is changed. The regulator 7 is designed to determine whether the set of the load-dump protecting operations and the cancelling operations of the protection mode is repeatedly performed by the corresponding rectifier module 5 or 6 according to the signals sent from the controller 100. Upon determining that the set of the load-dump protecting operations and the cancelling operations of the protection mode is repeatedly performed by the corresponding rectifier module 5 or 6, the regulator 7 forcibly supplies the current $If_{min}$ to the field winding 4 even if the output voltage $V_B$ is higher than the target regulated voltage Vreg. This increases a current flowing through each of the stator windings 2 and 3 at the cancel of the protection mode, thus increasing a current flowing through a corresponding low-side MOS transistor 51. Thus, it is possible to easily determine an appropriate timing of shifting to the rectifying mode to prevent the occurrence of a surge.

Second Embodiment

A power generator according to the second embodiment of the present disclosure will be described hereinafter with reference to FIGS. 13 to 16.

The structure and/or functions of the power generator according to the second embodiment are different from the power generator 1 by the following points. So, the different points will be mainly described hereinafter.

If a phase current flowing through a phase winding corresponding to a rectifier module 5X is low due to, for example, a small amount of a field current flowing through the field winding 4 immediately before the shift to the protection mode and/or a lower RPM of the rotor 4M, a phase voltage Vp across the phase winding illustrated in (B) of FIG. 5 may be difficult to appear. This may make it difficult for the load-dump protection determiner 140 of the rectifier module 5X to determine the shift timing from the protection mode to the rectifying mode based on the phase voltage Vp.

In order to address such a problem, the power generator according to the second embodiment includes a load-dump protection determiner 140A installed in each of the rectifier modules 5 and 6; this load-dump protection determiner 140A is different in structure from the load-dump protection determiner 140.

Specifically, as compared with the structure of the load-dump protection determiner 140, the load-dump protection determiner 140A is further comprised of a timer 147 (see FIG. 13).

The timer 147 is connected with each of the timing determiners 145 and 146.

Referring to FIG. 5, the phase voltage $V_P$ across a phase winding due to load dump cyclically varies within the range between a negative value (−0.1 V) and a positive value (+0.1 V) of the drain-source voltage $V_{DS}$ with a corresponding low-side MOS transistor 51 being on as long as a large amount of current (drain-source current) Id flows between the drain and source of the corresponding low-side MOS transistor 51. Thus, if the drain-source current Id is reduced, the drain-source voltage $V_{DS}$ is reduced so that the drain-source voltage $V_{DS}'$ is kept to be higher than the reference voltage $V_{REF}'$. This may cause the output of the current-flow direction detector 144 to be unchanged to the high level so that the output of the timing determiner 146 may be kept to the low level. Thus, no rectification restart instructions may be outputted from the timing determiner 146 to the controller 100.

In order to consider such a situation, the load-dump protection determiner 140 is additionally comprised of the timer 147.

The timer 147 is operative to start counting up from an initial value (zero) when the output of the threshold voltage determiner 142 is changed from the high level to the low level, and output a time-up signal when a threshold time corresponding to the counted value has elapsed since the start of the count-up. For example, the timer 147 is designed to output an electric signal with a low level while the counted value is not equal to a predetermined value corresponding to the threshold time, change the low level of the electric signal to an electric signal with a high level, and output, to each of the timing determiners 145 and 146, the high-level signal as a time-up signal.

The timing determiner 146 is operative to change its output from the low level signal to the high level signal if the output of the current-flow direction detector 144 is changed from the low level signal to the high level signal after change of the output of the threshold voltage determiner 142 from the high level signal to the low level signal. That is, the timing determiner 146 is not many operative to change its output from the low level signal to the high level signal if the output of the current-flow direction detector 144 is changed from the low level signal to the high level signal after change of the output of the threshold voltage determiner 142 from the high level signal to the low level signal.

In addition, the timing determiner 146 is operative to change its output from the low level signal to the high level signal when the time-up signal is outputted thereto from the timer 147 even if the output of the current-flow direction detector 144 is maintained low. In other words, the timing determiner 146 is operative to output the high level signal as the rectification restart instruction to the controller 100 when the time-up signal is outputted thereto from the timer 147 even if the output of the current-flow direction detector 144 is maintained low.

A fixed value can be used as the threshold time to be measured by the timer 147. As apparent from the waveform of the phase voltage Vp across a phase stator winding illustrated in FIG. 5, the phase voltage Vp should reach a range C or D within one cycle Ta of the phase voltage Vp after the output of the threshold voltage determiner 142 is changed from the high level to the low level; this range D is a range during which a current flows into the MOS transistor 51 or the diode 51a parallel thereto. That is, if the output of the current-flow direction detector 144 is not changed from the low level signal to the high level signal after the lapse of the one cycle Ta of the phase voltage Vp, it is possible to determine that a phase current flowing through a corresponding phase winding and a corresponding low-side MOS transistor 51 is so low that, even if the phase current is interrupted by the turnoff of the low-side MOS transistor 51, a surge cannot be generated across the corresponding phase winding.

Thus, a value equal to or longer than the maximum value in all possible values of the one cycle Ta can be set to the fixed value; the maximum value is a value of the one cycle Ta of the phase voltage Vp when the engine (rotor 4M) runs at idle. Using the fixed value as the threshold time allows easy determination of whether the threshold time has elapsed since the change of the output of the threshold voltage determiner 142 from the high level signal to the low level signal.

In order to immediately cancel the protection mode, the threshold time is required to be as short as possible. How short the predetermined time is depends on the operating conditions of the power generator in the protection mode, such as the rotational speed of the rotor 4M and the value of the field current flowing through the field winding 4 immediately before the shift to the protection mode.

A load-dump protection determiner 140B1 as a first modification of the load-dump protection determiner 140A is illustrated in FIG. 14. Referring to FIG. 14, the load-protection determiner 140B1 is further comprised of a threshold-time determiner 148A as compared with the structure of the load-dump protection determiner 140A.

The threshold-time determiner 148A is connected with each of the timing determiners 145 and 146, the timer 147, and the current-flow direction detector 144. The time determiner 148A is designed to variably determine the threshold time to be used by the timer 147 for outputting the time-up signal.

Specifically, the threshold-time determiner 148A is operative to take the cycle T1 of the change of output of the current-flow direction detector 144 from, for example, the high level to the low level, and determine the threshold time based on the cycle T1. The cycle T1 corresponds to a cycle of a corresponding phase voltage. That is, because the rotational speed of the rotor 4A of the power generator can be easily calculated based on the cycle T1 of the phase voltage, the threshold-time determiner 148A equivalently detects the rotational speed of the rotor 4A of the power generator based on the phase voltage.

For example, the threshold-time determiner 148A is operative to increase the threshold time with decrease in the rotational speed of the power generator, in other words, with increase in the cycle T1 of the phase voltage. In addition, the threshold-time determiner 148A is operative to reduce the threshold time with increase in the rotational speed of the power generator, in other words, with decrease in the cycle T1 of the phase voltage. The threshold-time determiner 148A can continuously change the threshold time smoothly depending on the rotational speed (cycle T1) of the power generator, or can discontinuously change the threshold time stepwisely depending on the rotational speed (cycle T1) of the power generator.

Because an appropriate timing to prevent or reduce a surge appears every cycle defined by the rotational speed of the rotor 4M, change of the threshold time depending on the rotational speed of the rotor 4M allows the threshold time to be determined as short as possible in consideration of the variation of the rotational speed of the rotor 4M. This cancels the protection mode as early as possible to immediately restart synchronous rectifying operations, thus improving the power generation efficiency of the power generator.

Particularly, detecting the variation of the rotational speed of the rotor 4M based on a corresponding phase voltage eliminates the need of additional elements for detection of the rotational speed of the rotor 4M and/or additional elements for allowing communications between a corresponding rectifier module and another element, such as the regulator 7, that detects the rotational speed of the rotor 4M. This simplifies each rectifier module in structure and in wiring configuration, and reduces it in size.

A load-dump protection determiner 140B2 as a second modification of the load-dump protection determiner 140A is illustrated in FIG. 15. Referring to FIG. 15, the load-protection determiner 140B2 is further comprised of a threshold-time determiner 148B as compared with the structure of the load-dump protection determiner 140A.

The threshold-time determiner 148B is connected with the timer 147 and the controller 100. As described in the first embodiment, the controller 100 of the control circuit 54 of each of the rectifier modules 5 and 6 is operative to perform synchronous rectifying operations based on the rotational speed (see reference character N in FIG. 15) of the rotor 4M of the power generator.

Thus, the threshold-time determiner 148B is operative to take the rotational speed N of the rotor 4M, and determine the threshold time based on the rotational speed N of the rotor 4M. Specifically, as well as the threshold-time determiner 148A illustrated in FIG. 14, the threshold-time determiner 148B is operative to increase the threshold time with decrease in the rotational speed N of the power generator. In addition, the threshold-time determiner 148B is operative to reduce the threshold time with increase in the rotational speed N of the power generator. The threshold-time determiner 148B can continuously change the threshold time smoothly depending on the rotational speed N of the power generator, or can discontinuously change the threshold time stepwisely depending on the rotational speed N of the power generator.

A load-dump protection determiner 140C as a third modification of the load-dump protection determiner 140A is illustrated in FIG. 16. Referring to FIG. 16, the load-protection determiner 140C is further comprised of a threshold-time determiner 149 as compared with the structure of the load-dump protection determiner 140A.

The threshold-time determiner 149 is connected with the timer 147 and the controller 100. The threshold-time determiner 149 is designed to variably determine the threshold time to be used by the timer 147 for outputting the time-up signal.

Specifically, the threshold-time determiner 149 is operative to take a value of the field current If flowing through the field winding 4 immediately before the shift to the protection mode from the regulator 7 via the controller 100 and the communication circuit 180; as the value of the field current If, a value of the duty cycle determined by the regulator 7 or a value for the field current If instructed by the regulator 7. Specifically, the threshold-time determiner 149 is operative to increase the threshold time with decrease in the value of the field current If. In addition, the threshold-time determiner 149 is operative to reduce the threshold time with increase in the value of the field current If. The threshold-time determiner 149 can continuously change the threshold time smoothly depending on the variation of the field current If, or can discontinuously change the threshold time stepwisely depending on the variation of the field current If.

A high value of the field current If before the shift to the protection mode will result in large energy to be generated across at least one phase winding due to load dump. Thus, a large amount of current will flow through the at least one phase winding, so that the current-flow direction detector 144 can more easily detect the direction of current flowing through the low-side MOS transistor 51. In contrast, a low value of the field current If before the shift to the protection mode will result in small energy to be generated across at least one phase winding due to load dump. Thus, a small amount of current will flow through the at least one phase winding, so that the current-flow direction detector 144 can be difficult to detect the direction of current flowing through the low-side MOS transistor 51. In view of them, change of the threshold time depending on the value of the field current If allows the threshold time to be determined as short as possible in consideration of the variation of the field current If. This cancels the protection mode as early as possible to immediately restart synchronous rectifying operations, thus improving the power generation efficiency of the power generator.

Third Embodiment

A power generator according to the third embodiment of the present disclosure will be described hereinafter with reference to FIGS. 17 to 24.

The structure and/or functions of the power generator according to the third embodiment are different from the power generator 1 by the following points. So, the different points will be mainly described hereinafter.

Referring to FIG. 5, the phase voltage $V_P$ across a phase winding due to load dump cyclically varies within the range between a negative value (−0.1 V) and a positive value (+0.1 V) of the drain-source voltage $V_{DS}$ with a corresponding low-side MOS transistor 51 being on as long as a large amount of current (a drain-source current Id) flows between the drain and source of the corresponding low-side MOS transistor 51. Thus, if the drain-source current Id is reduced so that the amplitude of the drain-source voltage $V_{DS}$ is reduced, determination of the direction of current flow through the corresponding low-side MOS transistor 51 by the current-flow direction detector 144 may be difficult depending on the reference voltage $V_{REF}'$ set forth above.

In order to address such a situation, the power generator according to the third embodiment includes a load-dump protection determiner 140D installed in each of the rectifier modules 5 and 6; this load-dump protection determiner 140D is different in structure from the load-dump protection determiner 140.

Specifically, as compared with the structure of the load-dump protection determiner 140, the load-dump protection determiner 140D is further comprised of a gate-source voltage setter 190 as an example of on-resistance setters (see FIG. 17).

The gate-source voltage setter 190 is connected with each of the timing determiners 145 and 146, the MOS voltage detector 143, and the controller 100.

The gate-source voltage setter 190 is operative to monitor the amount of current Id flowing between the drain and source of the corresponding low-side MOS transistor 51, which is on during the protection mode, and variably set the channel resistance between the drain and source of a corresponding low-side MOS transistor 51 as the on resistance thereof based on the monitored results.

Specifically, change of the gate-source voltage $V_{GS}$ of the drive signal to be applied to the gate of the low-side MOS transistor 51 carries out variable setting of the channel resistance of the low-side MOS transistor 51. When the gate-source voltage $V_{GS}$ is set by the gate-source voltage setter 190, the gate-source voltage $V_{GS}$ is instructed via the controller 100 to the driver 172, and the driver 172 applies the drive signal with the gate-source voltage $V_{GS}$ to the gate of the low-side MOS transistor 51, thus turning on the low-side MOS transistor 51.

FIG. 18 schematically illustrates how the gate-source voltage setter 190 variably sets the gate-source voltage $V_{GS}$. Let us assume that a level of the gate-source voltage $V_{GS}$ for turn-on of each of the high- and low-side MOS transistors 50 and 51 during rectifying mode is set to 10 V. In addition, when a low-side MOS transistor 51 is turned on by the level (10 V) of the gate-source voltage $V_{GS}$ during the protection mode, the drain-source voltage $V_{DS}'$ varies within the range from 0 V to 5 V. Moreover, a first reference voltage $V_{REF1}$ is set to be lower than the center (2.5 V) of the peak-to-peak amplitude of the drain-source voltage $V_{DS}'$ by $\Delta V1$, and a second reference voltage $V_{REF2}$ is set to be higher than the center (2.5 V) of the peak-to-peak amplitude of the drain-source voltage $V_{DS}'$ by $\Delta V2$; the $\Delta V2$ is greater than the $\Delta V1$. If the current Id flowing between the drain and source of the low-side MOS transistor 51 is high, the drain-source voltage $V_{DS}'$ varies to exceed each of the first and second reference voltages $V_{REF1}$ and $V_{REF2}$. Otherwise, if the current Id flowing between the drain and source of the low-side MOS transistor 51 becomes low so that the amplitude of the drain-source voltage $V_{DS}'$ is reduced, the drain-source voltage $V_{DS}'$ may vary to exceed the first reference voltage $V_{REF1}$ while being always lower than the second reference voltage $V_{REF2}$.

If the magnitude correlation between the drain-source voltage $V_{DS}'$ and the first reference voltage $V_{REF1}$ cyclically varies while that between the drain-source voltage $V_{DS}'$ and the second reference voltage $V_{REF2}$ does not frequently vary due to drop of the current flowing through the low-side MOS transistor 51, the gate-source voltage setter 190 detects the drop of the current flowing through the low-side MOS transistor 51, and changes the normal level (10 V) of the gate-source voltage $V_{GS}$ of the drive signal, which is to be applied to the gate of the low-side MOS transistor 51, to a level, such as 9 V, lower than the normal level (10 V) of the gate-source voltage $V_{GS}$ by a preset level of, for example, 1 V. Reduction of the gate-source voltage $V_{GS}$ increases the channel resistance between the drain and source of the low-side MOS transistor 51, thus increasing the drain-source voltage $V_{DS}'$. This results in that the magnitude correlations between the drain-source voltage $V_{DS}'$ and each of the first and second reference voltages $V_{REF1}$ and $V_{REF2}$ cyclically vary. At that time, if the current Id flowing between the drain and source of the low-side MOS transistor 51 is more reduced, the gate-source voltage setter 190 further reduces the gate-source voltage $V_{GS}$ of the drive signal again to increase the amplitude of the drain-source voltage $V_{DS}'$. This allows the magnitude correlations between the drain-source voltage $V_{DS}'$ and each of the first and second reference voltages $V_{REF1}$ and $V_{REF2}$ to cyclically vary.

Thus, the gate-source voltage setter 190 allows the magnitude correlation between the drain-source voltage $V_{DS}'$ and at least one reference voltage to cyclically vary independently of the amount of current Id flowing between the drain and source of the low-side MOS transistor 51.

As described above, the gate-source voltage setter 190 can repeatedly reduce the gate-source voltage $V_{GS}$ while the amount of current Id flowing between the drain and source of the low-side MOS transistor 51 is gradually reduced. Of course, while the amount of current Id flowing between the drain and source of the low-side MOS transistor 51 is gradually increased, the gate-source voltage setter 190 can repeatedly increase the gate-source voltage $V_{GS}$, thus reducing the amount of the drain-source voltage $V_{DS}'$. In addition, the gate-source voltage setter 190 can reduce the gate-source voltage $V_{GS}$ at once while the amount of current Id flowing between the drain and source of the low-side MOS transistor 51 is gradually reduced. For example, the initial level of the gate-source voltage $V_{GS}$ at an early state in the protection mode is set to the normal level of 10 V, and thereafter, if the current Id flowing between the drain and source of the low-side MOS transistor 51 is reduced by a certain level, the gate-source voltage setter 190 can reduce the gate-source voltage $V_{GS}$ to a preset level of, for example, 6.5 V. Similarly, the initial level of the gate-source voltage $V_{GS}$ at an early state in the protection mode is set to the normal level of 10 V, and thereafter, if the current Id flowing between the drain and source of the low-side MOS transistor 51 is increased by a certain level, the gate-source voltage setter 190 can increase the gate-source voltage $V_{GS}$ to a preset level higher than the normal level.

As described above, the power generator according to the third embodiment is configured to variably set the on resistance of the low-side MOS transistor 51 of each rectifier module according to the amount of current flowing through the low-side MOS transistor 51. The configuration obtains a sufficient-level voltage (a sufficient-level drain-source voltage) across a corresponding phase winding independently of the amount of current flowing through the low-side MOS transistor 51; the sufficient-level voltage allows the current-flow direction detector 144 to detect an appropriate timing to cancel the protection mode. This makes it possible to reliably determine an appropriate timing to cancel the protection mode with no or little surge.

The gate-source voltage setter 190 is configured to reduce the on resistance of the low-side MOS transistor 51 of each rectifier module, that is, increase the gate-source voltage $V_{GS}$ with increase in the current flowing through the low-side MOS transistor 51. The gate-source voltage setter 190 is also configured to increase the on resistance of the low-side MOS transistor 51 of each rectifier module, that is, reduce the gate-source voltage $V_{GS}$ with reduction in the current flowing through the low-side MOS transistor 51. These configurations set the drain-source voltage $V_{DS}$ across the low-side MOS transistor 51 to a sufficient level that allows the current-flow direction detector 144 to detect an appropriate timing to cancel the protection mode independently of the amount of current flowing through the low-side MOS transistor 51.

The gate-source voltage setter 190 is configured to monitor the drain-source voltage $V_{DS}$ across the low-side MOS transistor 51, more specifically, monitor the variation of the amplitude of the drain-source voltage $V_{DS}$, and detect the variation of current flowing through the low-side MOS transistor 51 based on the monitored results. The gate-source voltage setter 190 is however not limited to the configuration.

Specifically, the gate-source voltage setter 190 can be configured to calculate a value of current flowing through the low-side MOS transistor 51 during the protection mode based on: the variation of a field current If flowing through the field winding 4 and the variation of the rotational speed N of the rotor 4M immediately before the shift to the protection mode. As the value of the field current If, a value of the duty cycle of current (exciting current) to be supplied to the field winding 4 or a value for the exciting current instructed by the regulator 7 can be used. The duty cycle of current to be supplied to the field winding 4 is the ratio of the duration of current being supplied to the field winding 4 in each cycle to the cycle.

FIG. 19 schematically illustrates a relationship between a variable of the duty cycle of current to be supplied to the field winding immediately before the shift to the protection mode, a variable of the rotational speed N of the rotor 4M immediately before the shift to the protection mode, and a variable of current flowing through the low-side MOS transistor 51 of a rectifier module after the shift to the protection mode.

As illustrated in FIG. 19, plural pairs of each of specific values of the duty cycle of current to be supplied to the field winding 4 immediately before the shift to the protection mode and a corresponding value of the rotational speed N of the rotor 4M immediately before the shift to the protection mode are closely correlated with corresponding values of current flowing through the low-side MOS transistor 51 after the shift to the protection mode. For example, a pair of 50% of the duty cycle immediately before the shift to the protection mode and 6000 RPM of the rotational speed N of the rotor 4M immediately before the shift to the protection mode is closely correlated with 80 A of current flowing through the low-side MOS transistor 51 after the shift to the protection mode.

Thus, obtaining a value of the filed current If and a value of the rotational speed N immediately before the shift to the protection mode allows a corresponding value of the current flowing through the field winding 4 during the protection mode to be calculated based on the relationship illustrated in FIG. 19.

FIG. 20 schematically illustrates a load-dump protection determiner 140E as a first modification of the load-dump protection determiner 140D.

Referring to FIG. 20, the load-dump protection determiner 140E further includes a gate-source voltage setter 190A different from the gate-source voltage setter 190 illustrated in FIG. 17.

The gate-source voltage setter 190A stores therein a map M designed as, for example, a data table, a program, and/or a formula; this map M represents the relationship illustrated in FIG. 19.

The gate-source voltage setter 190A is designed to take a value of the rotational speed N of the rotor 4M calculated by the controller 100 immediately before the shift to the protection mode, and take a value of the duty cycle of current to be supplied to the field winding 4 immediately before the shift to the protection mode from the regulator 7 via the controller 100 and the communication circuit 180.

After the shift to the protection mode, the gate-source voltage setter 190A is designed to reference the map M using the pair of the rotational speed N of the rotor 4M and the value of the duty cycle of current to be supplied to the field winding 4 to extract a value of current flowing through a corresponding low-side MOS transistor 51. Then, the gate-source voltage setter 190A is designed to variably set the channel resistance stance between the drain and source of a corresponding low-side MOS transistor 51 as the on resistance thereof based on the value of the current flowing through a corresponding low-side MOS transistor 51. The gate-source voltage setter 190A can continuously change the channel resistance stance between the drain and source of the corresponding low-side MOS transistor 51, that is, the gate-source voltage $V_{GS}$ of the corresponding low-side MOS transistor 51 depending on the variation of the pair of a value of the rotational speed N and a value of the duty cycle of current to be supplied to the field winding 4, or can stepwisely change it depending on the variation of the pair of a value of the rotational speed N and a value of the duty cycle of exciting current to be supplied to the field winding 4.

Thus, taking a value of the rotational speed N and a value of the duty cycle of the field current If immediately before the shift to the protection mode from the controller 100 allows the variation of current flowing through a corresponding low-side MOS transistor 51 to be easily calculated without using additional elements for measuring the current flowing through the corresponding low-side MOS transistor 51.

FIG. 21 schematically illustrates a load-dump protection determiner 140F as a second modification of the load-dump protection determiner 140D.

As well as the load-dump protection determiner 140A illustrated in FIG. 13, the load-dump protection determiner 140F is further comprised of a timer 147. Because the operations of the timer 147 and the timing determiner 160 are substantially identical to those of the timer 147 and the timing determiner 146 of the load-dump protection determiner 140A described above, they are omitted in description.

FIG. 22 schematically illustrates a load-dump protection determiner 140G as a third modification of the load-dump protection determiner 140D.

As well as the load-dump protection determiner 140B1 illustrated in FIG. 14, the load-dump protection determiner 140G is further comprised of a threshold-time determiner 148A. Because the operations of the threshold-time determiner 148A are substantially identical to those of the threshold-time determiner 148A of the load-dump protection determiner 140B1 described above, they are omitted in description.

FIG. 23 schematically illustrates a load-dump protection determiner 140H as a fourth modification of the load-dump protection determiner 140D.

As well as the load-dump protection determiner 140B2 illustrated in FIG. 15, the load-dump protection determiner 140H is further comprised of a threshold-time determiner 148B. Because the operations of the threshold-time determiner 148E are substantially identical to those of the threshold-time determiner 148B of the load-dump protection determiner 140B2 described above, they are omitted in description.

FIG. 24 schematically illustrates a load-dump protection determiner 140I as a fifth modification of the load-dump protection determiner 140D.

As well as the load-dump protection determiner 140C illustrated in FIG. 16, the load-dump protection determiner 140I is further comprised of a threshold-time determiner 149. Because the operations of the threshold-time determiner 149 are substantially identical to those of the threshold-time determiner 149 of the load-dump protection determiner 140C described above, they are omitted in description.

The gate-source voltage setter 190 can be installed in the controller 100, or can be provided separately from the load-dump protection determiner and the controller 100.

The present disclosure is not limited to the aforementioned embodiments, and can be modified within the scope of the present disclosure.

Some of the features of one power generator in the power generators according to the first to third embodiments can be applied to another power generator in them according to the first to third embodiments.

In each of the second and third embodiments, the threshold voltage determiner 142A can be omitted.

Each of the power generators according to the first to third embodiments is provided with two sets of first and second stator windings 2 and 3, and with corresponding two sets of rectifier modules 5 and 6, but the present disclosure is not limited thereto. Specifically, each of the power generators according to the first to third embodiments can be provided with the first stator windings 2 and the rectifier modules 5 therefor.

Each of the power generators according to the first to third embodiments serves as a power generator to rectify three-phase AC voltages, but the present disclosure is not limited thereto. Specifically, each of the power generators according to the first to third embodiments can be configured to change on and off timings of each of the MOS transistors 50 and 51 to serve as a rotary electric machine (motor) that inverts a DC voltage supplied from the battery 9 into three-phase AC voltages, and that applies the three-phase AC voltages to one set of three-phase stator windings, thus turning the rotor 4M based on a rotating magnetic field induced in the one set of three-phase stator windings according to the three-phase AV voltages.

Each of the power generators according to the first to third embodiments is configured to detect the drain-source voltage $V_{DS}$ of the low-side MOS transistor 51, and determine an appropriate timing of shifting to the protection mode or an appropriate timing of cancelling the protection mode to shift to the rectifying mode, but the power generator 1 is not limited thereto. Specifically, each of the power generators according to the first to third embodiments can be configured to directly detect the direction or value of current flowing through the low-side MOS transistor 51. For example, a current sensing element S, such as a resistor, can be connected to the drain or source of the low-side MOS transistor 51 (see FIG. 2), and a corresponding load-dump protection determiner can be configured to measure the direction or value of current flowing through the low-side MOS transistor 51 based on the voltage across the current sensing element S, and determine, based on the measured direction or value, an appropriate timing of shifting to the protection mode or an appropriate timing of cancelling the protection mode to shift to the rectifying mode. In this modification, the load-dump protection determiner can reliably detect a range D (see (B) of FIG. 5) during which a current flows into the MOS transistor 51 or the diode 51a parallel thereto, thus shifting to the protection mode or cancelling the protection mode. This prevents instantaneous interruption or immediate change of current flowing through a corresponding phase winding, making it possible to prevent a surge from being generated from the corresponding phase winding.

In each of the power generators according to the first to third embodiments, three rectifier modules for one set of stator windings are provided, but an alternative number of rectifier modules for one set of stator windings can be provided. In each of the power generators according to the first to third embodiments, a MOS transistor is provided as each of high-side (upper arm) and low-side (lower arm) switching elements, but a diode can be provided as high-side rectifying element, and a MOS transistor or another type power transistor can be provided as low-side rectifying elements.

In each of the first to third embodiments, a corresponding load-dump determiner is provided in each rectifier module, but the output voltage determiner 141 and threshold value determiner 142 in the corresponding load-dump determiner can not be provided in each rectifier module, and they can be provided for all of the rectifier modules 5 and 6, or for each set of the rectifier modules 5 and the rectifier modules 6. In addition, the control circuit 54 is provided in each of the rectifier modules, but the control circuit 54 can be provided commonly for all of the rectifier modules 5 and 6 or for each set of the rectifier modules 5 and the rectifier modules 6. However, in these modifications, the MOS voltage detector 143, the current-flow direction determiner 144, each of the timing determiners 145 and 146, the timer 147, a corresponding threshold-time determiner, and a corresponding gate-source voltage setter need be provided for each lower-arm MOS transistor (low-side MOS transistor).

A structure required to perform synchronous rectifying operations other than load-dump protection operations can not be provided in each rectifier module, but provided for all of the rectifier modules 5 and 6, or for each set of the rectifier modules 5 and the rectifier modules 6.

FIG. 25 schematically illustrates a part of a power generator according to a first modification of each of the first to third embodiments. The power generator illustrated in FIG. 25 includes a rectifier control circuit 54A commonly provided for the set of three rectifier modules 5X, 5Y, and 5Z for the first stator windings 2. Similarly, a rectifier control circuit can be commonly provided for the set of three rectifier modules 5U, 5V, and 5W for the second stator windings 3. The second stator windings 3, another set of three rectifier modules 5U, 5V, and 5W for the second stator windings 3, and a rectifier control module provided commonly for the set of three rectifier modules 5U, 5V, and 5W are omitted in illustration in FIG. 25.

Referring to FIG. 25, the rectifier module 5X (5Y or 5Z) includes the high-side MOS transistor 50, the low-side MOS transistor 51, a load-dump protection determiner 140X (140Y or 140Z), a controller 100X (100Y or 100Z), a driver 170X (170Y or 170Z), a driver 172X (172Y or 172Z), an AND circuit 190X (190Y or 190Z), and an OR circuit 192X (192Y or 192Z). Each of the driver 170X and the driver 172X is identical to a corresponding one of the drivers 170 and 172 illustrated in FIG. 3.

The load-dump protection determiner 140X corresponds to any one of the load-dump protection determiners 140, 140A, 140B1, 140B2, 140C, 140D, 140E, 140F, 140G, 140H, and 140I, and has a substantially same configuration as the configuration of the one of the load-dump protection determiners 140, 140A, 140B1, 140B2, 140C, 140D, 140E, 140F, 140G, 140H, and 140I. The controller 100X is comprised of the structure associated with the load-dump protection operations and operations to shift to the rectifying mode, which are extracted from the structure of the controller 100 illustrated in FIG. 3. Specifically, the controller 100X is configured to independently turn on and off each of the MOS transistors 50 and 51 according to the output of the load-dump protection determiner 140X.

The rectifier control circuit 54A is comprised of, for each phase stator winding 2, a structure constructed by eliminating, from the control circuit 54 illustrated in FIGS. 2 and 3, the load-dump protection circuit 140, the drivers 170 and 172, and the functions of the controller 100X. In other words, the rectifier control circuit 54A is comprised of the structure required to carry out normal synchronous rectifying operations for each phase stator winding 2.

During the rectifying mode, a high level signal is inputted from the controller 100X to one input terminal of the AND circuit 190X, and a low level signal is inputted from the controller 100X to one input terminal of the OR circuit 192X. Thus, a rectifier control signal outputted from the rectifier control circuit 54A is inputted to the other input terminal of each of the AND circuit 190X and the OR circuit 192X so that the rectifier control signal outputted from each of the AND circuit 190X and the OR circuit 192X is inputted to a corresponding one of the drivers 170X and 172X. Thus, the drivers 170X and 172X independently drive the corresponding high- and low-side MOS transistors 50 and 51 to thereby carry out synchronous rectifying operations set forth above.

On the other hand, during the protection mode after the occurrence of load dump, a low level signal is inputted from the controller 100X to the one input terminal of the AND circuit 190X, and a high level signal is inputted from the controller 100X to the one input terminal of the OR circuit 192X. Thus, the high-side MOS transistor 50 is forcibly turned off by the driver 170X based on the low level signal, and the low-side MOS transistor 51 is forcibly turned on by the driver 172X based on the high level signal.

The structure and operations of each of the load-dump protection determiners 140Y and 140Z is identical to those of the load-dump protection determiner 140X, and the structure and operations of each of the controllers 100Y and 100Z are identical to those of the controller 100X.

As described above, the power generator can be configured such that the rectifier control circuit 54A is commonly provided for the first set of the three rectifier modules 5X, 5Y, and 5Z for the three rectifier modules 5X, 5Y, and 5Z, and the structure for load-dump protection is provided for each of the three rectifier modules 5X, 5Y, and 5Z. Particularly, the rectifier control circuit 54A can be configured to monitor rectifying operations of the high- and low-side MOS transistors 50 and 51 for one phase winding as a result of control of the rectifying operations, and modify rectifying operations of the high- and low-side MOS transistors 50 and 51 for another phase winding based on the monitored rectifying operations of the high- and low-side MOS transistors 50 and 51 for the one phase winding.

The rectifier control circuit 54A can be commonly provided for each of the first set of the three rectifier modules 5X, 5Y, and 5Z and the second set of the three rectifier modules 5U, 5V, and 5W, and can carry out synchronous rectifying operations of the first set of the three rectifier modules 5X, 5Y, and 5Z, and those of the second set of the three rectifier modules 5U, 5V, and 5W.

In each of the first to third embodiments, the first and second stator windings 2 and 3 are connected with the charge line 12 via a common output terminal of them. For this reason, it is effective in reduction of the rising of the potential at the common output terminal that a structure (protection circuit) required to perform load-dump protection operations can not be provided in each phase stator winding, but commonly provided for each set of the first stator windings 2 and the second stator windings 3.

FIG. 26 schematically illustrates a part of a power generator according to a second modification of each of the first to third embodiments. The power generator illustrated in FIG. 26 includes a first protection circuit commonly provided for the set of three rectifier modules 5X, 5Y, and 5Z for the first stator windings 2, and a second protection circuit commonly provided for the set of three rectifier modules 5U, 5V, and 5W for the second stator windings 3.

Like the first modification, the rectifier module 5X (5Y or 5Z) includes the high-side MOS transistor 50, the low-side MOS transistor 51, a driver 170X (170Y or 170Z), a driver 172X (172Y or 172Z), an AND circuit 190X (190Y or 190Z), and an OR circuit 192X (192Y or 192Z).

Similarly, the rectifier module 5U (5V or 5Z) includes the high-side MOS transistor 50, the low-side MOS transistor 51, a driver 170U (170V or 170W), a driver 172U (172V or 172W), an AND circuit 190U (190V or 190W), and an OR circuit 192U (192V or 192W).

Specifically, the first protection circuit is comprised of a load-dump protection determiner 140-2 and a controller 100-2 provided for the first stator windings 2. The load-dump protection determiner 140-2 includes the functions of the load-dump protection determiners 140X, 140Y, and 140Z, and the controller 100-2 includes the functions of the controllers 100X, 100Y, and 100Z. Similarly, the second protection circuit is comprised of a load-dump protection determiner 140-3 and a controller 100-3 provided for the second stator windings 3. The load-dump protection determiner 140-3 includes the functions of the load-dump protection determiners 140X, 140Y, and 140Z, and the controller 100-3 includes the functions of the controllers 100X, 100Y, and 100Z.

The rectifier control circuit 54A is provided commonly for the set of three rectifier modules 5X, 5Y, and 5Z for the first stator windings 2, and the set of three rectifier modules 5U, 5V, and 5W for the second stator windings 3. The rectifier control circuit 54A is configured to carry out synchronous rectifying operations of the high- and low-side MOS transistors 50 and 51 of the respective first stator windings 2, and synchronous rectifying operations of the high- and low-side MOS transistors 50 and 51 of the respective second stator windings 3. The rectifier control circuit 54A can be commonly provided for each of the set of the first stator windings 2 and the set of the second stator windings 3. As illustrated in FIGS. 25 and 26, even if the rectifier control circuit 54A is provided commonly for the set of three rectifier modules 5X, 5Y, and 5Z for the first stator windings 2 and the set of three rectifier modules 5U, 5V, and 5W for the second stator windings 3, two or more protection circuits provided, for example, for the respective first and second stator windings 2 and 3 increase the reliability of protection of the electrical loads 10 against load dump.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A rotary electric machine with a rotatable rotor, the rotary electric machine comprising:
    at least two-phase stator windings;
    a rectifying unit including, for each of the at least two-phase stator windings, a pair of a high-side rectifying element and a low-side rectifying element, at least the low-side rectifying element including a switching element with a diode connected in parallel thereto, the rectifying unit being configured to rectify an alternating current voltage induced across each of the at least two-phase stator windings;
    a turn-on unit configured to monitor an output voltage of the rectifying unit, and turn on the switching element as the low-side rectifying element for at least one of the at least two-phase stator windings when the output voltage exceeds a first threshold voltage due to a load dump; and
    a turnoff unit configured to:
        monitor the output voltage of the rectifying unit;
        after the output voltage, which exceeded the first threshold voltage once, falls below a second threshold voltage, wait for turnoff of the switching element as the low-side rectifying element for the at least one of the at least two-phase stator windings until a turnoff time suited for preventing occurrence of a surge across the at least one of the at least two-phase stator windings appears, the second threshold voltage being set to be lower than the first threshold voltage; and
        turn off, at the appearance of the turnoff time, the switching element as the low-side rectifying element for the at least one of the at least two-phase stator windings.

2. The rotary electric machine according to claim 1, further comprising:
    a field winding for magnetizing a field pole;
    a regulator configured to control a current flowing through the field winding to regulate the output voltage of the rectifying unit to a target voltage; and
    a second-threshold voltage determiner configured to determine the second threshold voltage relative to the target voltage.

3. The rotary electric machine according to claim 2, wherein the second-threshold voltage determiner is configured to determine the second threshold voltage to be higher than the target voltage.

4. The rotary electric machine according to claim 2, wherein the second-threshold voltage determiner is configured to determine the second threshold voltage to be equal to or lower than the target voltage.

5. The rotary electric machine according to claim 1, wherein the turn-on unit is configured to, after the output voltage exceeds the first threshold voltage, wait for turn-on of the switching element as the low-side rectifying element for the at least one of the at least two-phase stator windings until a turn-on time suited for preventing occurrence of a surge across the at least one of the at least two-phase stator windings appears, and turn on, at the appearance of the turn-on time, the switching element as the low-side rectifying element for the at least one of the at least two-phase stator windings.

6. The rotary electric machine according to claim 1, wherein a set of turn-on and turnoff commands of the switching element as the low-side rectifying element for the at least one of the at least two-phase stator windings are repeated by the turn-on unit and the turnoff unit until energy changed in the at least one of the at least two-phase stator windings due to the load dump sufficiently decays while the output voltage varies within a range from the first threshold voltage and the second threshold voltage.

7. The rotary electric machine according to claim 1, wherein the turnoff time is a time when no current flows from the at least one of the at least two-phase stator windings to the switching element as the low-side rectifying element.

8. The rotary electric machine according to claim 1, wherein the turnoff time is a time when no current flows from the switching element as the low-side rectifying unit to the at least one of the at least two-phase stator windings.

9. The rotary electric machine according to claim 7, wherein the switching element as the low-side rectifying element is a MOS transistor, and the turnoff unit comprises:
    a MOS voltage determiner configured to detect a drain-source voltage of the MOS transistor;
    a current-flow direction determiner configured to, if the MOS transistor is turned on, determine a direction of a current flowing through the MOS transistor; and
    a time determiner configured to determine the turnoff time based on the direction of the current determined by the current-flow direction determiner.

10. The rotary electric machine according to claim 9, further comprising:
    a field winding for magnetizing a field pole;
    a regulator configured to control a current flowing through the field winding to regulate the output voltage of the rectifying unit to a target voltage; and
    a second-threshold voltage determiner configured to determine the second threshold voltage relative to the target voltage,
    wherein the second-threshold voltage determiner is configured to determine the second threshold voltage to be higher than the target voltage, and, if the output voltage exceeds the first threshold voltage so that the MOS transistor is turned on, the regulator is configured to supply a current to the field winding, the current having a value that allows the MOS voltage determiner to detect the drain-source voltage of the MOS transistor.

11. The rotary electric machine according to claim 9, further comprising:
a field winding for magnetizing a field pole;
a regulator configured to control a current flowing through the field winding to regulate the output voltage of the rectifying unit to a target voltage; and
a second-threshold voltage determiner configured to determine the second threshold voltage relative to the target voltage,
wherein the second-threshold voltage determiner is configured to determine the second threshold voltage to be equal to or lower than the target voltage, and, if the output voltage, which exceeded the first threshold voltage once, falls up to the second threshold voltage, the regulator is configured to supply a current to the field winding, the current having a value that allows the MOS voltage determiner to detect the drain-source voltage of the MOS transistor.

12. The rotary electric machine according to claim 1, wherein the switching element as the low-side rectifying element is a MOS transistor, and the turnoff time suited for preventing occurrence of a surge across the at least one of the at least two-phase stator windings is a time at which a drain-source voltage relative to a source of the MOS transistor is equal to or lower than 0 V.

13. The rotary electric machine according to claim 1, wherein the switching element as the low-side rectifying element is a MOS transistor, and the turnoff time suited for preventing occurrence of a surge across the at least one of the at least two-phase stator windings is a time delayed by a preset period from a time at which a drain-source voltage relative to a source of the MOS transistor is equal to or lower than 0 V.

14. The rotary electric machine according to claim 13, wherein the preset period is a quarter of one cycle of a phase voltage across the at least one of the at least two-phase stator windings.

15. The rotary electric machine according to claim 1, wherein the turnoff time suited for preventing occurrence of a surge across the at least one of the at least two-phase stator windings is synchronized with a cycle at which a current-flow direction through the switching element after the switching element being on is changed from a direction out of the at least one of the at least two-phase stator windings into the switching element to a direction out of the switching element into the at least one of the at least two-phase stator windings.

16. The rotary electric machine according to claim 1, wherein the turn-on unit and the turnoff unit are provided for each of the at least two-phase stator windings.

17. The rotary electric machine according to claim 1, wherein the turnoff unit is configured to forcibly turn off the switching element as the low-side rectifying element for the at least one of the at least two-phase stator windings when failing to detect the turnoff time.

18. The rotary electric machine according to claim 17, wherein a timing to forcibly turn off the switching element as the low-side rectifying element is a time when a threshold time has elapsed since the output voltage, which exceeded the first threshold voltage once, falls below the second threshold voltage.

19. The rotary electric machine according to claim 18, wherein the threshold time is a variable value.

20. The rotary electric machine according to claim 18, wherein the threshold time is a fixed value.

21. The rotary electric machine according to claim 19, wherein the turnoff unit is configured to increase the threshold time with a reduction of a rotational speed of the rotatable rotor, and reduce the threshold time with an increase of the rotational speed of the rotatable rotor.

22. The rotary electric machine according to claim 21, wherein the turnoff unit is configured to detect variation of the rotational speed based on a phase voltage across the at least one of the at least two-phase stator windings.

23. The rotary electric machine according to claim 19, further comprising:
a field winding for magnetizing a field pole,
wherein the turnoff unit is configured to reduce the threshold time with an increase of a field current flowing through the field winding before turn-on of the switching element after the output voltage exceeds the first threshold voltage, and increase the threshold time with a reduction of the field current flowing through the field winding before turn-on of the switching element after the output voltage exceeds the first threshold voltage.

24. The rotary electric machine according to claim 17, wherein the switching element as the low-side rectifying element is a MOS transistor, and the turnoff unit comprises:
a MOS voltage determiner configured to detect a drain-source voltage of the MOS transistor;
a current-flow direction determiner configured to, if the MOS transistor is turned on, determine a direction of a current flowing through the MOS transistor;
a time determiner configured to determine the turnoff time based on the direction of the current determined by the current-flow direction determiner; and
a threshold time measuring unit configured to measure a threshold time, and send, to the time determiner, a lapse of the threshold time.

25. The rotary electric machine according to claim 24, wherein, when the time determiner fails to determine the turnoff time because of a small amount of the current flowing through the MOS transistor, the turnoff unit determines that detection of the turnoff time has failed.

26. The rotary electric machine according to claim 1, further comprising:
an on-resistance setter configured to set an on resistance of the switching element with the switching element being on according to an amount of a current flowing through the switching element,
wherein the turnoff unit is configured to determine that the turnoff time suited for preventing occurrence of a surge across the at least one of the at least two-phase stator windings is based on a voltage across the switching element.

27. The rotary electric machine according to claim 26, wherein the on-resistance setter is configured to reduce the on resistance with an increase of the current flowing through the switching element, and increase the on resistance with a reduction of the current flowing through the switching element.

28. The rotary electric machine according to claim 26, wherein the on-resistance setter is configured to monitor the voltage across the switching element, and detect variation of the current flowing through the switching element based on the monitored voltage across the switching element.

29. The rotary electric machine according to claim 26, further comprising:

a field winding for magnetizing a field pole, wherein the on-resistance setter is configured to calculate variation of the current flowing through the switching element based on: a variation of a field current flowing through the field winding immediately before turn-on of the switching element after the output voltage exceeds the first threshold voltage; and a variation of a rotational speed of the rotatable rotor.

30. The rotary electric machine according to claim 26, further comprising:

a MOS voltage determiner configured to detect a drain-source voltage of the MOS transistor;

a current-flow direction determiner configured to, if the MOS transistor is turned on, determine a direction of a current flowing through the MOS transistor; and a time determiner configured to determine the turnoff time based on the direction of the current determined by the current-flow direction determiner, wherein the on-resistance setter variably sets a voltage of a drive signal to be applied to the MOS transistor to change a channel resistance between a source and a drain of the MOS transistor.

* * * * *